US012291893B2

(12) United States Patent
Bloom et al.

(10) Patent No.: US 12,291,893 B2
(45) Date of Patent: May 6, 2025

(54) ELECTRONIC LOCK

(71) Applicant: LOCKUS, LLC, Dayton, OH (US)

(72) Inventors: Rachel Bloom, Dayton, OH (US); Julie Bloom, Dayton, OH (US); Saul Owide, Columbus, OH (US)

(73) Assignee: LOCKUS, LLC, Dayton, OH (US)

( * ) Notice: Subject to any disclaimer, the term of this patent is extended or adjusted under 35 U.S.C. 154(b) by 30 days.

(21) Appl. No.: 18/483,319

(22) Filed: Oct. 9, 2023

(65) Prior Publication Data

US 2024/0076902 A1 Mar. 7, 2024

Related U.S. Application Data

(63) Continuation of application No. 16/987,467, filed on Aug. 7, 2020, now Pat. No. 11,781,344.

(60) Provisional application No. 62/891,215, filed on Aug. 23, 2019.

(51) Int. Cl.
*E05B 35/00* (2006.01)
*E05B 17/00* (2006.01)
*E05B 47/00* (2006.01)

(52) U.S. Cl.
CPC .......... *E05B 35/00* (2013.01); *E05B 17/0087* (2013.01); *E05B 47/0012* (2013.01); *E05B 2035/009* (2013.01); *E05B 2047/0024* (2013.01); *E05B 2047/0096* (2013.01); *E05Y 2201/10* (2013.01); *E05Y 2400/612* (2013.01); *E05Y 2400/664* (2013.01); *E05Y 2400/86* (2013.01)

(58) Field of Classification Search
CPC .. E05B 35/00; E05B 17/0087; E05B 47/0012; E05B 2035/009; E05B 2047/0024; E05B 2047/0096; E05Y 2201/10; E05Y 2400/612; E05Y 2400/664; E05Y 2400/86; Y10T 70/415; Y10T 70/7068
USPC .................................................. 70/20, 278.1
See application file for complete search history.

(56) References Cited

U.S. PATENT DOCUMENTS

| | | | | |
|---|---|---|---|---|
| 11,781,344 B2 * | 10/2023 | Bloom | ................ | E05B 47/0012 70/21 |
| 2009/0282876 A1 * | 11/2009 | Zuraski | ................. | E05B 67/003 70/278.1 |
| 2017/0009491 A1 * | 1/2017 | Nguyen | ............. | G07C 9/00563 |
| 2020/0145820 A1 * | 5/2020 | Hoyer | ................. | G06F 21/6209 |
| 2021/0054653 A1 * | 2/2021 | Bloom | ............... | G07C 9/00563 |
| 2021/0174620 A1 * | 6/2021 | Kusanale | ............ | E05B 47/0012 |

FOREIGN PATENT DOCUMENTS

WO WO-2022103390 A1 * 5/2022 ......... E05B 17/0087

* cited by examiner

*Primary Examiner* — Suzanne L Barrett
(74) *Attorney, Agent, or Firm* — Thomas E. Lees, LLC

(57) ABSTRACT

An electronic lock includes a housing, and a locking system within the housing. The locking system includes electronics and a lock. More particularly, the housing contains therein, a controller and at least one electronic input device electrically coupled to the controller, where the controller causes the lock to transition between a locked position to an unlocked position responsive to input from the electronic input device.

20 Claims, 11 Drawing Sheets

700
707
702
704
706
708
714
710
712

ELECTRONIC LOCK

CROSS REFERENCE TO RELATED APPLICATIONS

This application is a continuation of U.S. patent application Ser. No. 16/987,467, filed Aug. 7, 2020, now allowed, which claims the benefit of U.S. Provisional Patent Application Ser. No. 62/891,215, filed Aug. 23, 2019, entitled "ELECTRONIC LOCK", the disclosure of which is hereby incorporated by reference.

BACKGROUND

The present disclosure relates generally to locks, and more particularly, to an electronic lock, techniques to open an electronic lock, and articles incorporating an electronic lock, as set out in greater detail herein.

Numerous applications exist where a user may desire to secure an item, article, device, etc., from unwanted or otherwise undesired access. In this regard, there are a variety of lock styles that are available, which can be used for temporary securement of the item, article, device, etc. For instance, padlocks are available that require either a physical key or a known combination to open the lock. Moreover, electronic locks are available, e.g., which require a known pin code that is entered via a keypad in order to unlock the lock.

BRIEF SUMMARY

According to aspects of the present disclosure, an electronic lock is provided. The electronic lock comprises a housing having a lock aperture extending through a face thereof. Here, the lock aperture is configured to receive a lock arm of a corresponding locking mechanism. Here, the lock arm includes an aperture.

The electronic lock also comprises a controller contained in the housing, a biometric interface attached to the housing, and a biometric reader contained in the housing. The biometric reader is electrically coupled to the controller. Additionally, the biometric reader is electrically coupled to the biometric interface. Yet further, the electronic lock comprises a locking system contained within the housing. The locking system comprises a release spring, a locking pin, a locking spring, an electric actuator, and a lock lever.

The locking system is controlled by the controller to transition between a locked position and an unlocked position. In this regard, to lock the locking mechanism to the housing, the lock arm of the locking mechanism is inserted into the lock aperture of the housing until the lock arm compresses the release spring of the locking system sufficient to enable the aperture of the lock arm to align with the locking pin of the locking system. Under this operation, the locking spring of the locking system urges the locking pin into the aperture of the lock arm of the locking mechanism, thereby locking the locking mechanism to the housing.

To transition from the locked position to the unlocked position, the controller controls the electric actuator to move the lock lever so as to compress the locking spring sufficient to release the locking pin from the aperture of the lock arm. When the locking pin is removed from the aperture of the lock arm, the release spring urges the lock arm toward the lock aperture of the housing away from the locking pin.

The electronic lock still further comprises a battery that powers at least the controller, the biometric reader, and the electric actuator.

In operation, the controller issues an electronic unlock command signal to the electric actuator to cause the electronic lock to transition from the locked position to the unlocked position upon agreement of a match of electronic data corresponding to a biometric read by the biometric reader to biometric data accessible by the controller identifying an authorized user.

According to still further aspects of the present disclosure, an article including an electronic lock is provided. The article includes a zipper clasp and an electronic lock. The zipper clasp has a zipper handle and a zipper attachment extending from the zipper handle, where the zipper attachment includes a securement for attaching the zipper clasp to a zipper of the article. The zipper clasp also includes a zipper lock arm extending generally orthogonally from the zipper handle proximate to an end portion of the zipper handle that is opposite the zipper attachment. The zipper lock arm has an aperture.

The electronic lock is secured to the article, and comprises a housing having a front face defining a major surface, where at least a portion of the front face is exposed to a user. The housing also comprises a lock aperture extending through the front face, where the lock aperture is dimensioned to receive the zipper lock arm of the zipper clasp.

The electronic lock also comprises a controller that is contained in the housing, a biometric interface that is attached to the housing, and a biometric reader that is contained in the housing. The biometric reader is electrically coupled to the controller. Additionally, the biometric reader is electrically coupled to the biometric interface.

The electronic lock yet further comprises a locking system contained within the housing. The locking system comprises a release spring, a locking pin, a locking spring, an electric actuator, and a lock lever. Under this configuration, the locking system is controlled by the controller to transition between a locked position and an unlocked position.

To lock the zipper clasp to the housing, the zipper lock arm of the zipper clasp is inserted into the lock aperture of the housing until the zipper lock arm compresses the release spring sufficient to enable the aperture of the zipper lock arm to align with the locking pin of the locking system. In this configuration, the locking spring of the locking system urges the locking pin into the aperture of the zipper lock arm of the zipper clasp, thereby locking the zipper clasp to the housing.

To transition from the locked position to the unlocked position, the controller controls the electric actuator to move the lock lever so as to compress the locking spring sufficient to release the locking pin from the aperture of the zipper lock arm. Here, the release spring urges the lock arm toward the lock aperture of the housing away from the locking pin.

The electronic lock moreover comprises a battery that powers at least the controller, the biometric reader, and the electric actuator, In operation, the controller issues an electronic unlock command signal to the electric actuator to cause the lock to transition from the locked position to the unlocked position upon agreement of a match of electronic data corresponding to a biometric read by the biometric reader to biometric data accessible by the controller identifying an authorized user.

BRIEF DESCRIPTION OF THE DRAWINGS

The following detailed description of various aspects of the present disclosure may be best understood when read in conjunction with the following drawings, where like structure is indicated with like reference numerals, and in which.

Figure 2:
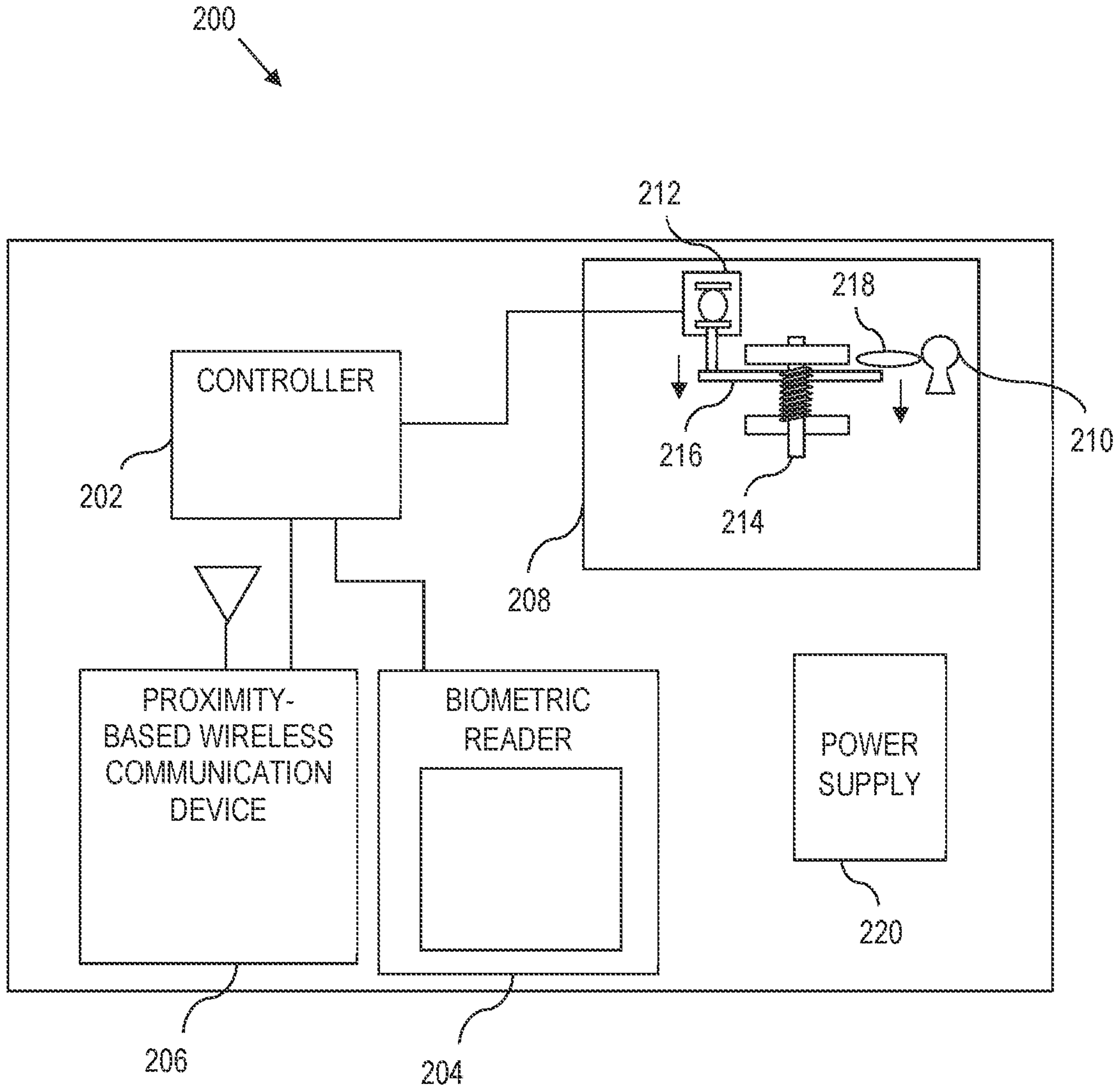
FIG. 2 is a block diagram illustrating components of the electronic lock of FIG. 1 according to aspects of the present disclosure.
Figure 4:
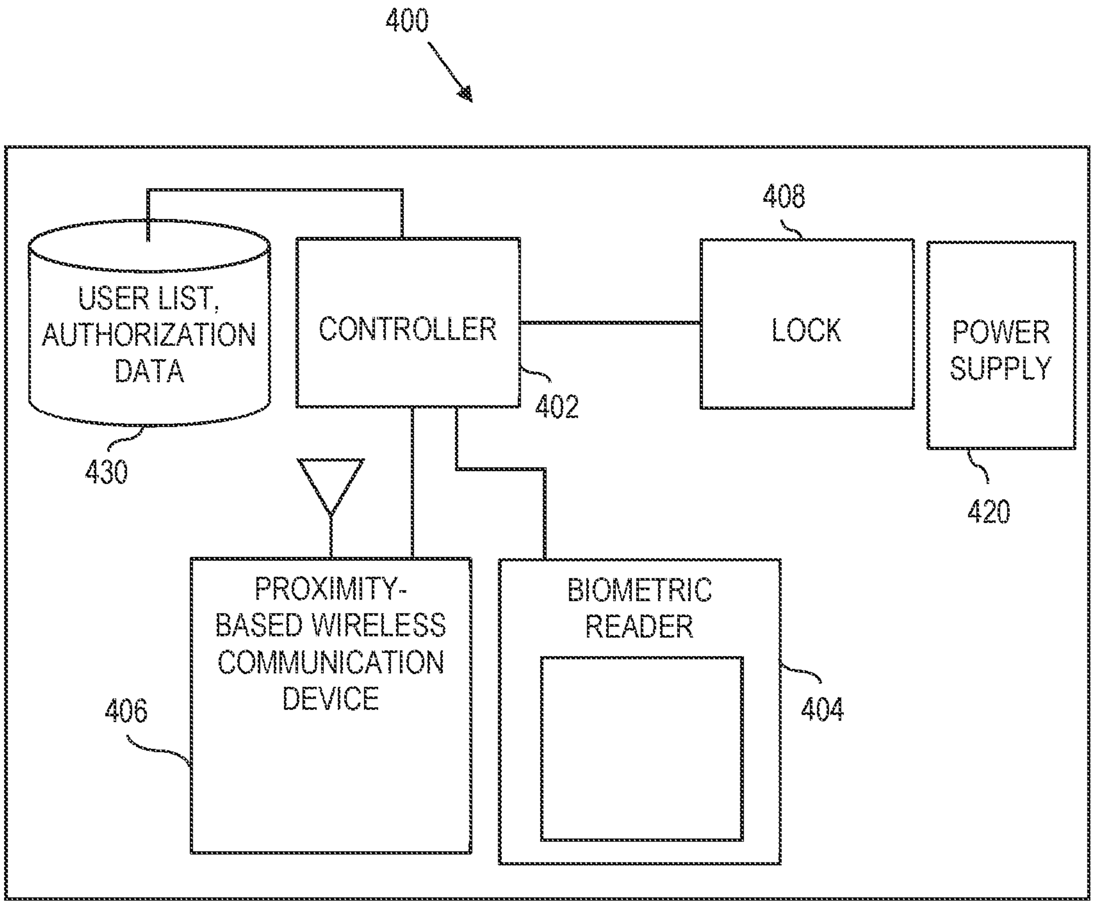
Figure 5:
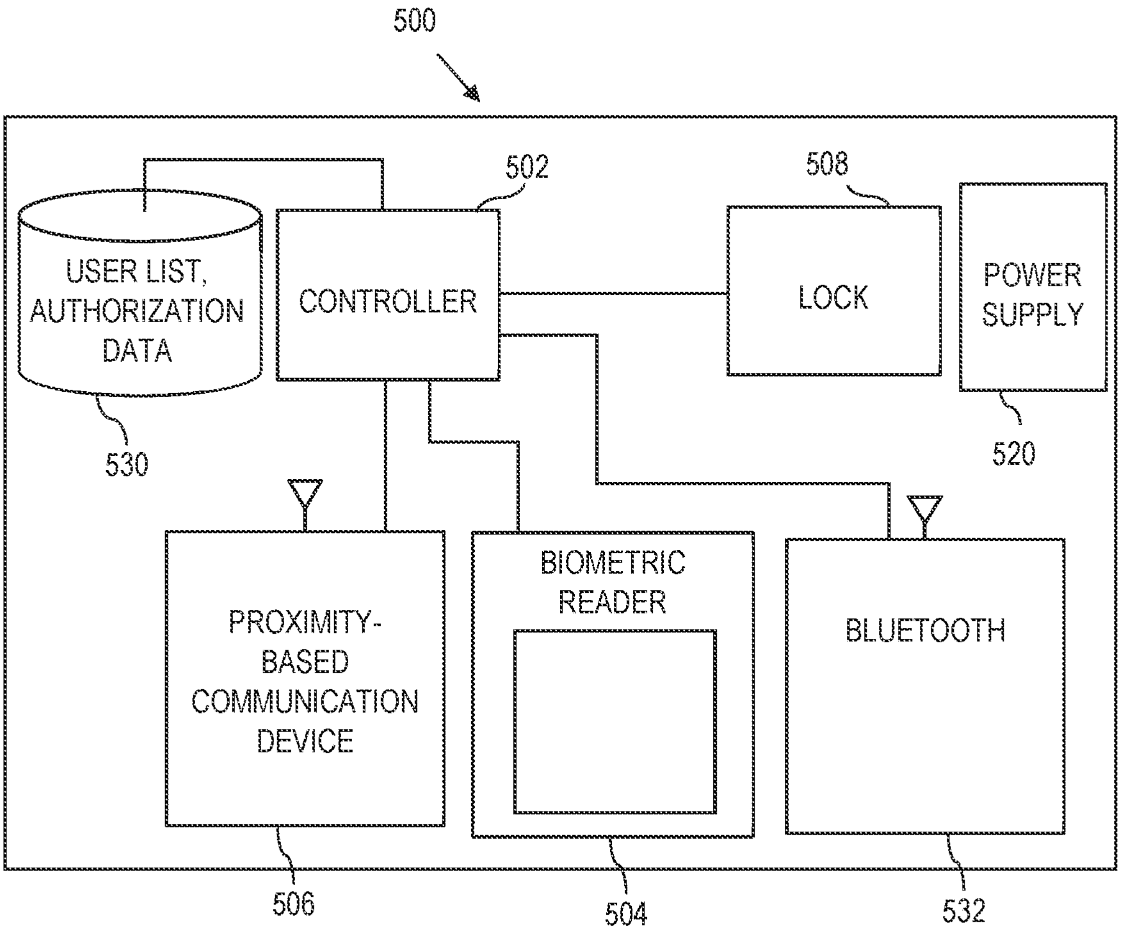
Figure 6:
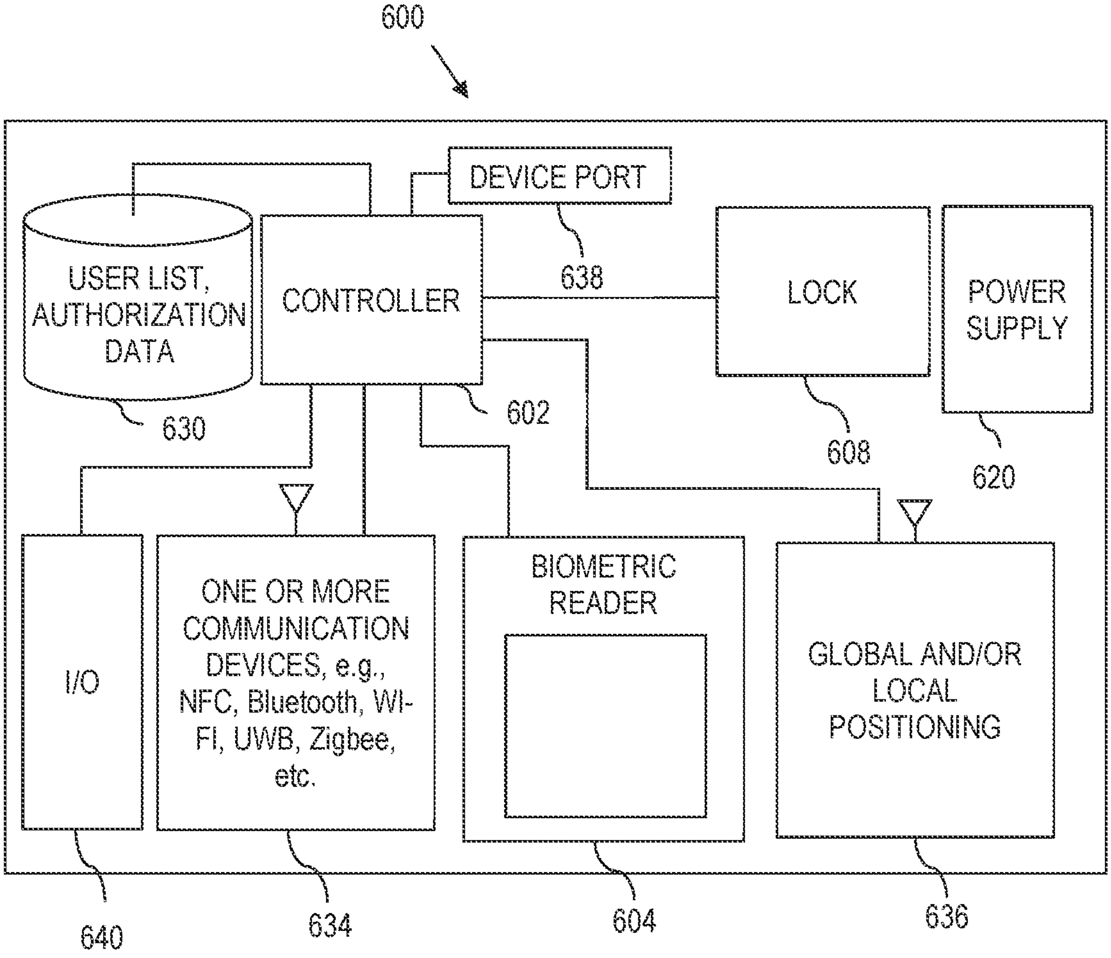
Figure 7:
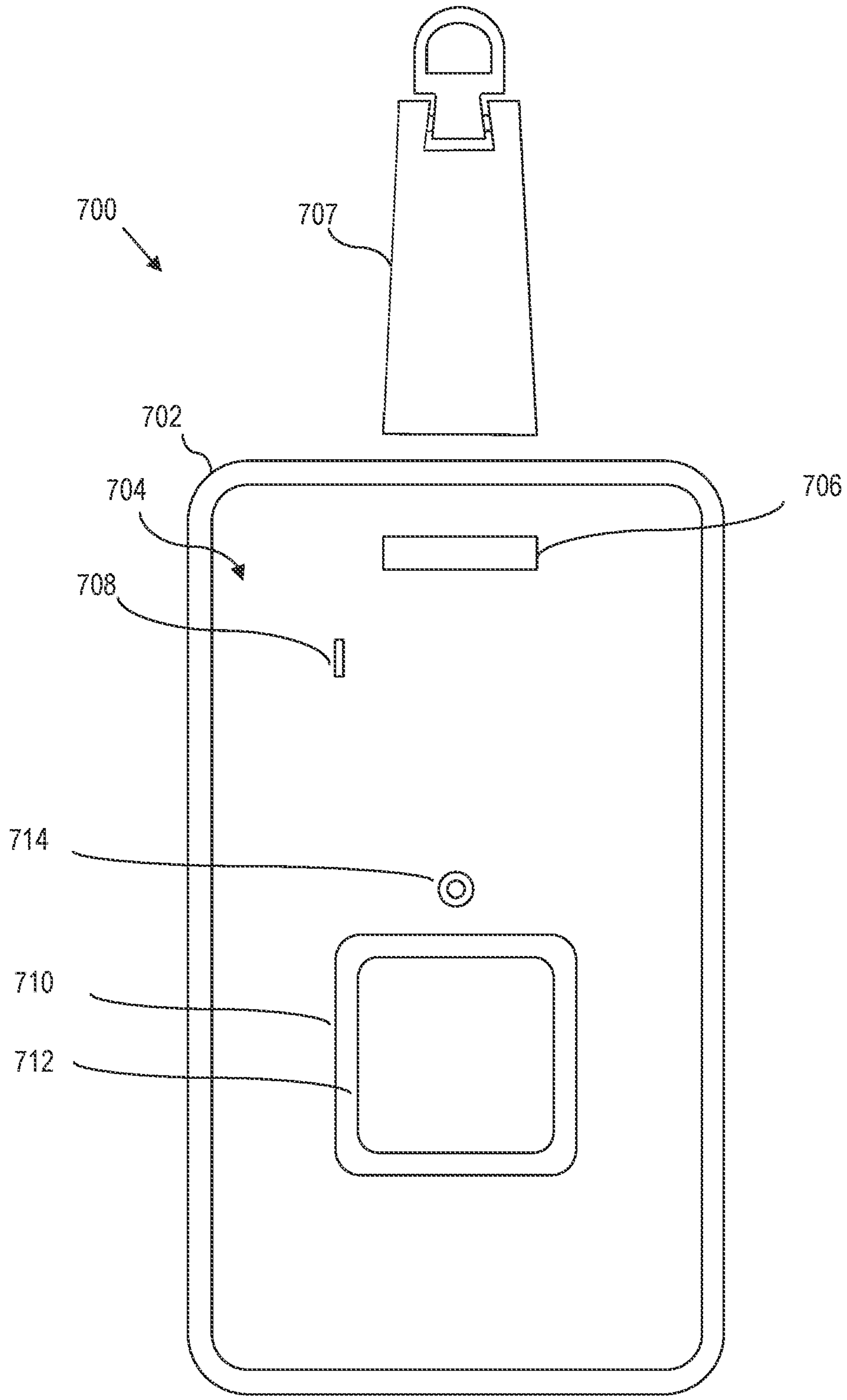
Figure 8:
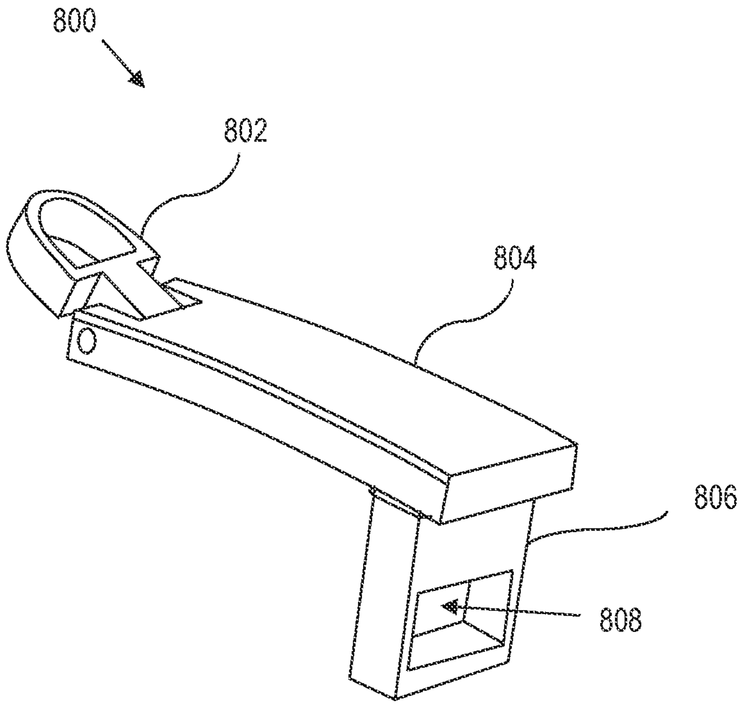
Figure 9A:
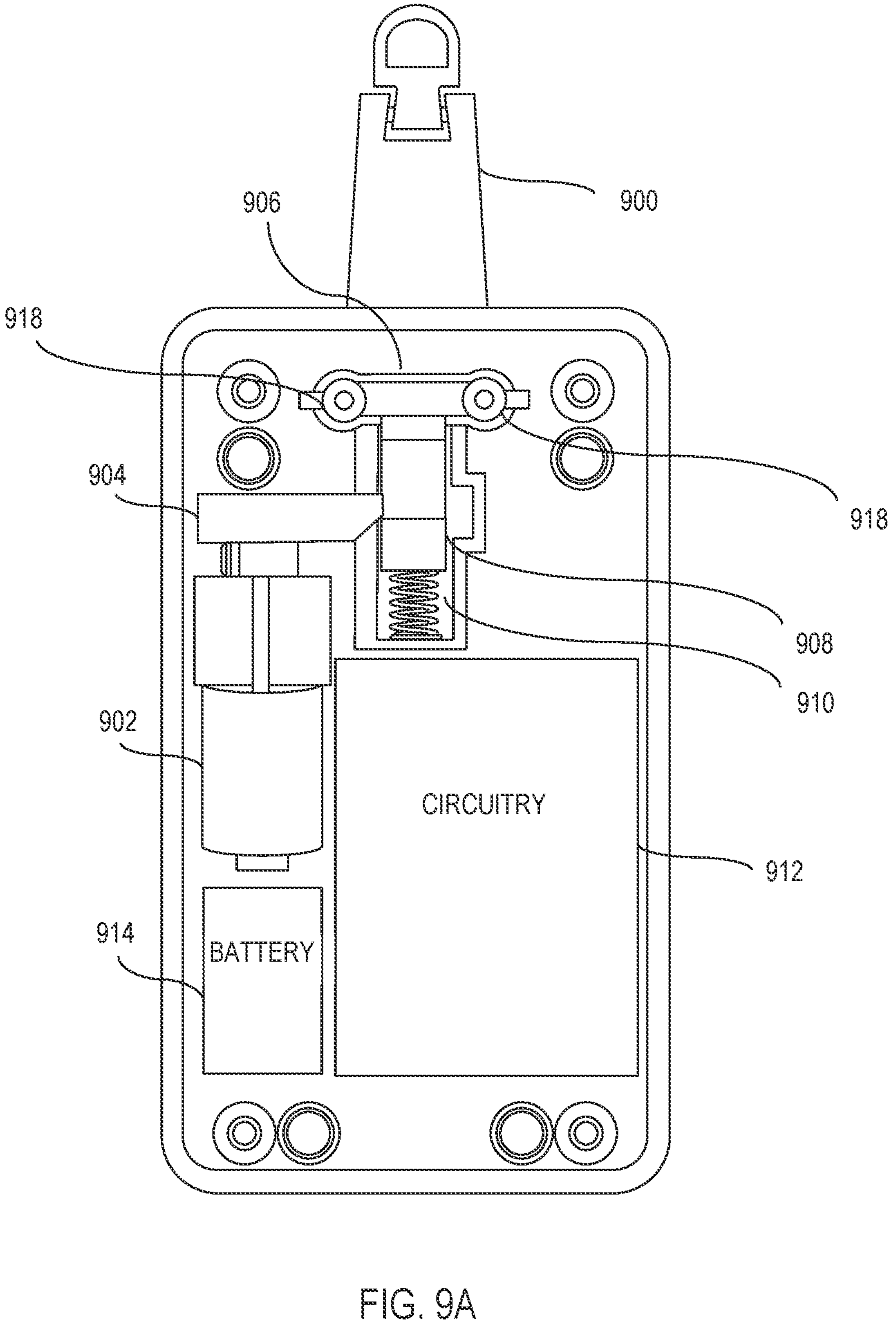
Figure 9B:
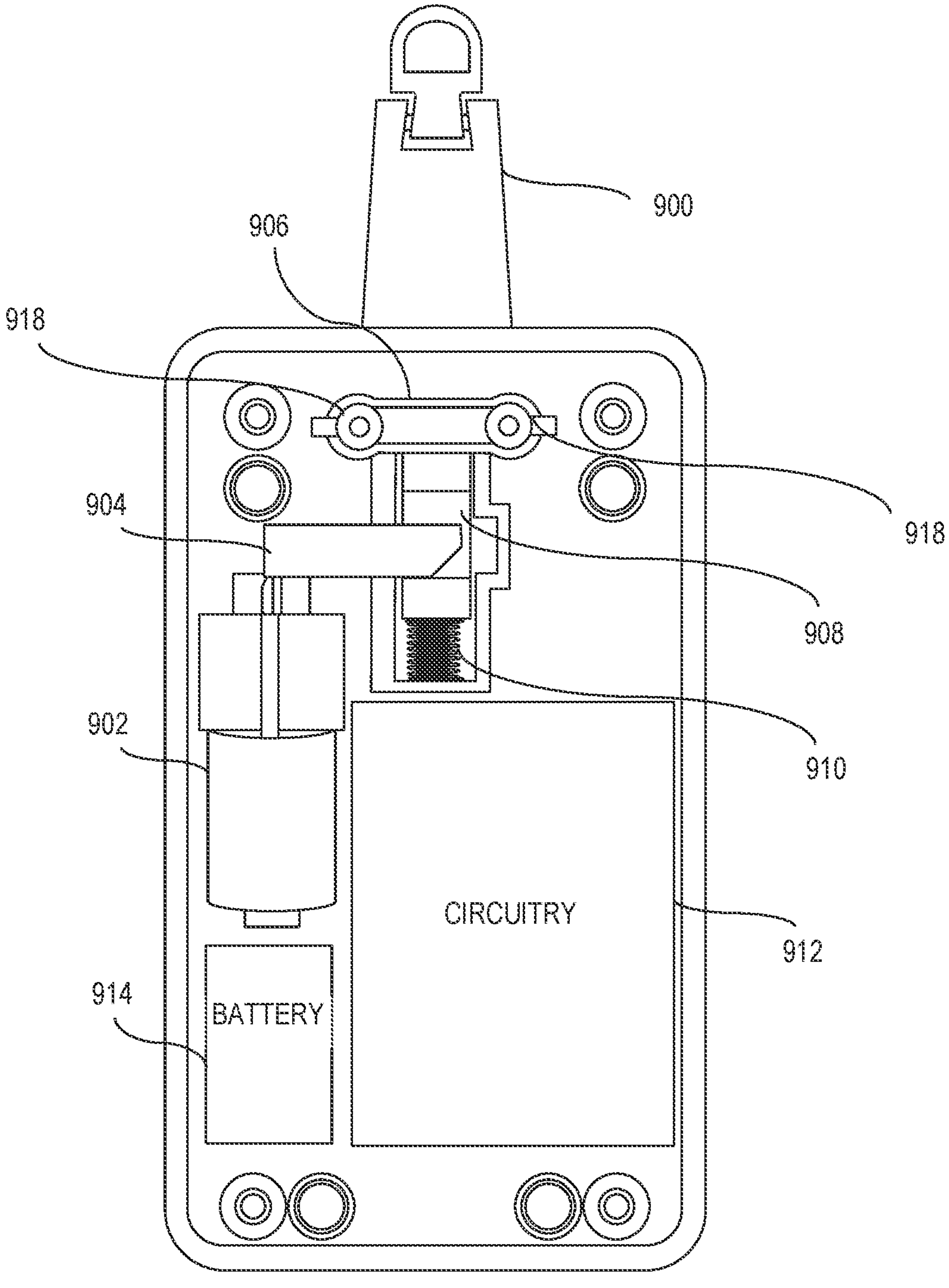
Figure 10:
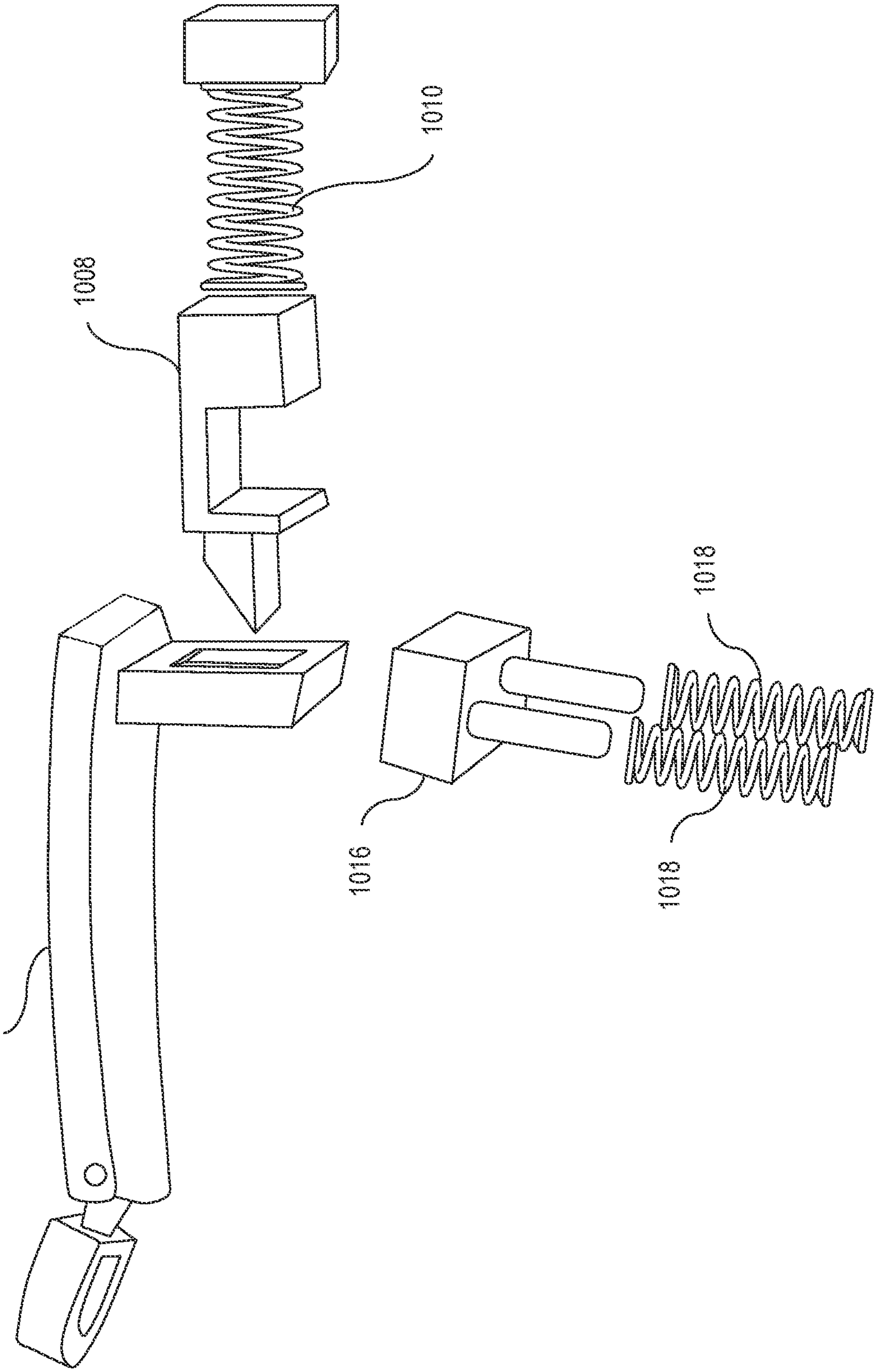

aspects of the present disclosure;

FIG. 4 is a block diagram of an example electronic lock that is analogous to the block diagram of FIG. 2, but adds a built-in user authorization list, according to aspects of the present disclosure;

FIG. 5 is a block diagram of an example electronic lock that is analogous to the block diagram of FIG. 4, but adds a transceiver, according to aspects of the present disclosure;

FIG. 6 is a block diagram of an example electronic lock that is analogous to the block diagram of any one or more of FIG. 2, FIG. 4, FIG. 5 but adds a built-in device port, positioning system, I/O, or combination thereof, according to aspects of the present disclosure;

FIG. 7 illustrates a top view an example electronic lock according to aspects herein;

FIG. 8 illustrates an example zipper clasp usable with the electronic lock of FIG. 7;

FIG. 9A illustrates the back of the electronic lock of FIG. 7 with the back removed to show select components thereof, FIG. 8 illustrating an example approach to implement a zipper lock, where the lock is in a "locked state";

FIG. 9B illustrates the back of the electronic lock of FIG. 7 with the back removed to show select components thereof, FIG. 9 illustrating an example approach to implement a zipper lock, where the lock is in an "unlocked state"; and FIG. 10 illustrates an exploded view of select components of the lock to illustrate various aspects of the present disclosure.

DETAILED DESCRIPTION

According to aspects of the present disclosure, various configurations are disclosed, which are suitable to implement an electronic lock. In this regard, an electronic lock is disclosed herein, which takes a form factor of a general-purpose smart lock, making the smart lock usable to lock any suitable article to which the smart lock is applied. In other applications, a smart lock is provided that is either formed as an integral part of an article, or the smart lock can be incorporated into an article transforming the article into a smart, lockable article.

According to further aspects of the present disclosure, techniques herein implement technology in a personalized manner so as to provide an increased likelihood that an individual opening the lock is truly an authorized individual. In this regard, the personalized technology can be implemented locally within the lock itself, via communication with a remote device (such as via short range communication with an electronic appliance, long range communication such as across a network including the Internet, etc.), combinations thereof, etc.

Electronic Lock Example A

Figure 1:
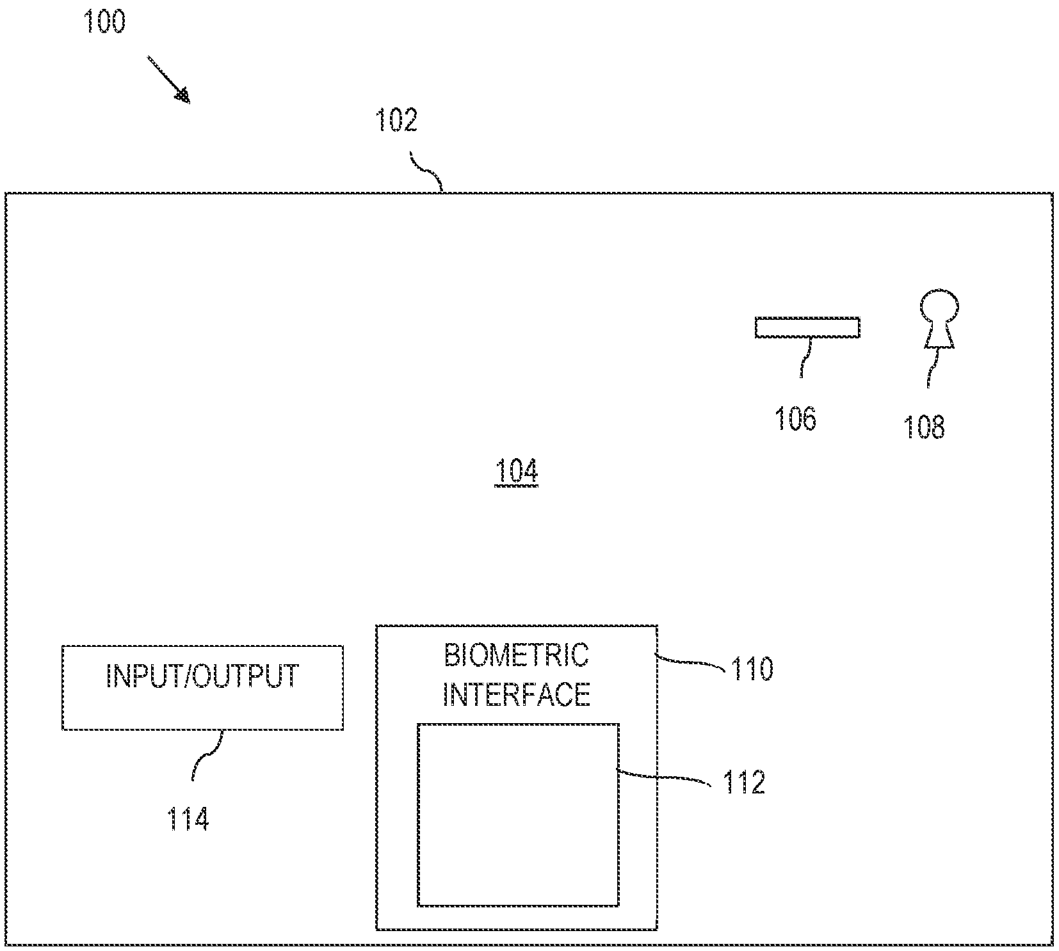
FIG. 1 illustrates an electronic lock according to aspects of the present disclosure.

Referring now to the drawings, and in particular to FIG. 1, an electronic lock 100 is illustrated. The electronic lock 100 includes a housing 102 having a first face 104 that defines a major surface facilitating interaction with the electronic lock 100. The housing 102 is shown with a generally "box" shaped form factor solely for convenience of illustration and discussion of key features herein. In practice, the housing 102 can take on any shape and/or size, e.g., to conform to intended applications, technology contained therein, aesthetics, combinations thereof, etc. The electronic lock 100 can also be incorporated into a structure, e.g., into a diary, bag, luggage, purse, or other article.

In practical applications, one or more features of the electronic lock 100 may be exposed to a user via the housing 102. For instance, as illustrated in the example electronic lock 100 of FIG. 1, a lock aperture 106 extends through the first face 104 of the housing 102. The lock aperture 106 defines an opening in the electronic lock 100 that receives a corresponding locking mechanism, which may be integral with the housing 102 (e.g., a shackle), or a separate (e.g., a detachable component such as a zipper clasp). In practical applications, the particular positioning, size, shape, etc., of the lock aperture 106 will depend upon the implemented physical locking technique. For instance, the lock aperture 106 may include or be configured to receive a clasp, shackle, hook, bolt, etc. (not shown in FIG. 1 for clarity of illustration).

Also as illustrated, an optional keyhole 108 can be provided. Where utilized, the keyhole 108 passes through the housing 102. In the embodiment shown in FIG. 1, the keyhole 108 extends through the first face 104 of the housing 102. However, in other embodiments, the keyhole 108, when provided, can extend through or otherwise couple to any other surface of the housing 102. Regardless of location, the keyhole 108 provides an interface that receives a physical key that is specifically configured to unlock/open the locking mechanism of the electronic lock 100. As will be described in greater detail herein, the physical key operates the locking mechanism independent of an electronic unlock signal (also specifically described in greater detail herein). Likewise, the electronic locking mechanism can unlock the lock independent of the physical key. As a result, in some embodiments, the electronic lock 100 can always be opened, even where no power is available to the electronic lock 100.

Still further, at least one electronic authorization device is provided. The electronic authorization device is used to authorize a user to a controller of the electronic lock. As will be described in greater detail herein the authorization device can comprise any number of modalities, which may include a biometric scanner, an electronic keypad, a wireless communication device, etc. Examples of electronic authorization devices are described more fully herein.

However, for sake of example, FIG. 1 illustrates an authorization device implemented as a biometric interface 110 that is attached to or otherwise passes through the housing 102. In the embodiment shown in FIG. 1, the biometric interface 110 is attached to or otherwise extends through the first face 104 of the housing 102. However, in other embodiments, the biometric interface 110 can attach to or otherwise extend through any other surface of the housing 102. Regardless of location, the biometric interface 110 receives biometric information from a user. In some embodiments, the received biometric information can be used to unlock the electronic lock 100. In other embodiments, the received biometric information can be used to lock the electronic lock 100. In still further embodiments, the received biometric information can be used as a part of a multi-part authentication, verification, other scheme, etc., examples of which are set out in greater detail herein.

In practical applications, the biometric interface 110 can form part of a fingerprint/thumbprint scanner. In this regard, the biometric interface 110 can optionally include a pad 112. The pad 112 provides an interface for receiving a biometric input from a user. However, other biometric-based sensing technologies can also/alternatively be utilized.

Optionally, the electronic lock can also include one or more user interface input/output features. The input/output 114 can include buttons, pads, knobs, encoders, switches, or other input and/or output devices that facilitate user interaction with the lock.

Electronic Lock Example B

Referring to FIG. 2, a block diagram illustrates an embodiment of the electronic lock 100 of FIG. 1. In particular, a controller 202 is provided that handles the main processing of the electronic lock. In this regard, the controller 202 can function as a "supervisor" processor, overseeing the processing of other technologies, the controller 202 can handle the core processing itself, or combinations thereof.

Notably, in the illustrated embodiment, an electronic authorization device implemented as a biometric reader 204 is electrically coupled to the controller 202. More particularly, the electric coupling provides an electrical pathway by which the controller 202 and the biometric reader 204 communicate. In practical applications, the electrical coupling provides a communicative coupling that may be unidirectional or bi-directional. That is, in some embodiments, the biometric reader 204 sends information to the controller 202. In other embodiments, the communication is bi-directional such that the controller 202 transmits information (e.g., commands, data, combinations thereof, etc.) to the biometric reader 204, and the controller 202 receives information (e.g., commands, data, requests, etc.) from the biometric reader 204.

The biometric reader 204 is also electrically coupled to the biometric interface 110 (FIG. 1). That is, the biometric reader 204 further interacts with the counterpart biometric interface 110 and optional pad 112 of FIG. 1 to obtain electronic data corresponding to a biometric read by the biometric reader. In this regard, the controller can compare biometric data accessible by the controller identifying an authorized user to the electronic data corresponding to the biometric read by the biometric reader to authenticate the user. In this regard, the biometric reader 204 can be a biometric scanner, e.g., for a fingerprint placed on pad 112 (FIG. 1), or the biometric reader 204 can be any other biometric-based technology.

In some embodiments, an optional electronic authorization device such as an optional proximity-based wireless communication device 206 can be provided, e.g., in addition to, or in lieu of the biometric reader 204. The proximity-based wireless communication device 206 is also electrically coupled to the controller 202. More particularly, the electrical coupling provides a communicative pathway by which the controller 202 and the proximity-based wireless communication device 206 communicate. In practical applications, the electrical coupling provides communicative coupling that can be unidirectional or bi-directional. Analogous to that discussed above, in some embodiments, the proximity-based wireless communication device 206 sends information to the controller 202. In other embodiments, the communication is bi-directional such that the controller 202 transmits information (e.g., commands, data, combinations thereof, etc.) to the proximity-based wireless communication device 206, and the controller 202 receives information (e.g., commands, data, requests, etc.) from the proximity-based wireless communication device 206.

In practical applications, the proximity-based wireless communication device 206 can comprise any suitable short range (e.g., typically less than 30 meters) communication technology, such as low energy Bluetooth, Zigbee, ultra-wide band (UWB), etc. As yet a further example, the proximity-based wireless communication device 206 can comprise an active or passive radio frequency identification (RFID) device, which may provide a range of approximately 1-6 meters, or greater for active RFID system. Similarly, low power FOBs can be configured to be limited to a few meters. In other embodiments, the proximity-based wireless communication device 206 can comprise near field communication (NCF) device (or other magnetic field induction technology that enables communication). In this embodiment, a working range of 10-20 centimeters is more practical. Still further, the proximity-based wireless communication device 206 can comprise an inductive based technology that requires intimate contact with the housing of the electronic lock 200. In this regard, requiring contact with the housing of the electronic lock 200 may be advantageous, e.g., to increase the likelihood of a deliberate attempt to engage the proximity-based wireless communication device 206.

A lock 208 is also electronically coupled to the controller 202. In a manner analogous to that described above, the electronic coupling provides an electrical pathway by which the controller 202 and the lock 208 communicate. In this regard, communication can be unidirectional, or bi-directional. In general, the lock 208 includes a combination of mechanical and electrical components necessary to mechanically implement the lock.

For instance, the lock 208 can include, or be coupled to, any necessary electrical and/or mechanical components to receive a locking mechanism (such as a clasp, shackle, hook, bolt, etc.) that is passed through the lock aperture 106 (FIG. 1). As an illustrative example, the lock 208 can be coupled to an electronic actuator such as a solenoid, actuator (e.g., a linear actuator, a rotary actuator, etc.), a motor, a motor and a cam arrangement, motor and slider-crank, or other structure that converts rotational to linear motion, etc. The components can also include an electronic actuator control circuit where required.

Yet further, additional mechanical components such as springs, wedges, locks, etc., may be provided as are necessary to lock and unlock the device.

In general terms, the lock 208 transitions from a locked position to an unlocked position in cooperation with the locking mechanism (e.g., a clasp lock, shackle, etc.) that is insertable into the lock aperture. The specific configuration of the lock 208 will thus vary depending upon the implemented technology, type of locking mechanism used, etc. For instance, a physical lock may have different components when securing a clasp, e.g., attached to a zipper, compared to locking to a barb on a shackle for a padlock or bar-style lock.

While not required, in some embodiments, a mechanical key receiver 210 is configured to accept a physical key, e.g., passed through the keyhole 108 (FIG. 1). The mechanical key receiver 210 is configured to unlock the lock 208 in a manner that is independent of the electronic locking circuit, such that the lock can be opened without a requirement for power. That is, the lock is controlled to transition from the locked position to the unlocked position by the mechanical key receiver engaged by the physical key such that the physical key can unlock the lock independent of the unlock command signal from the controller.

The provision of the mechanical key receiver 210 facilitates a backup mechanism to unlock the device. The mechanical key receiver 210 can also function as an electronic lock override, e.g., in case of an electrical or logic malfunction. Yet further, the mechanical key receiver 210 can function as a Transportation Security Administration (TSA) key making the electronic lock suitable for travel applications. Thus, the mechanical key receiver can accept a physical key that is compatible with a Transportation Security Administration (TSA) key to transition the lock from the locked position to the unlocked position.

Solely for sake of a non-limiting example, the lock 208 is schematically illustrated as having an electric actuator 212 (e.g., a linear actuator, rotary actuator, motor, a motor and a cam arrangement, motor and slider-crank, or other structure that converts rotational to linear motion, etc.) that is controlled by the controller 202. The electric actuator 212 provides the electronically controlled motive force to open the lock to transition the device from a locked state to an unlocked state. For instance, the electric actuator 212 may move a pin responsive to an unlock signal from the controller 202, so as to release the locking mechanism. In this example, a spring-biased pin 214 can be used to hold the locking mechanism inserted therein. For instance, the spring-bias can be used to provide an automatic and positive lock when a user inserts the locking mechanism through the lock aperture in the housing. As a few examples, inserting a clasp through the lock aperture causes a bias against the spring causing the pin to lock to the clasp mechanically, so that energy is not consumed by the electronics to enter a locked state. A coupler 216 is provided so as to form a mechanical interface so that the pin can be activated to unlock the locking mechanism either by the controller 202, e.g., via the electric actuator 212 or via a response by the mechanical key receiver 210 receiving a valid key, e.g., a user inserts and properly turns a valid physical key. In this regard, the lock 208 may require other mechanical or electrical components 218, e.g., one or more cams, gears, magnets, actuators, etc., as required to enable both mechanical and electrical unlocking, such that the mechanical unlock can override or otherwise work independent of the electrical unlock.

The electronic lock 200 is also illustrated as having a power supply 220. The power supply 220 can comprise a battery, which may be rechargeable, user-replaceable, or otherwise configured. As used herein, "battery" includes multiple batteries, cells, and other energy sources. The batteries may be rechargeable, replaceable, or a combination thereof. For sake of clarity, the power supply 220 is not shown as being wired to the other electronic circuits solely for sake of clean schematic diagram. In practice, the power supply 220 provides power to any component or components that require power. In this regard, the power supply 220 can include its own circuitry, including sleep circuitry that minimizes power consumption by entering a low power sleep mode until a user begins to interface with the electronic lock to unlock the locking mechanism thereof.

As will be described in greater detail herein, in an example embodiment, the power supply, controller or other device can also regulate and/or monitor the charge of the power source. In this regard, a threshold (or thresholds) can be set that determine when the battery is about the run out of charge. If the battery charge falls below that threshold, the lock may be unlocked so as to not leave the lock in a locked state. As an illustrative example, a measure of battery characteristic (e.g., charge) is evaluated against predetermined threshold(s) (e.g., first threshold and second threshold) as a percentage of predicted charge remaining. If the charge falls below the first threshold, but is above the second threshold, a warning is provided. If the battery charge falls below the second threshold, an action can be taken, e.g., an email can be pushed to the user's smartphone, the lock can be automatically unlocked, etc.

As an illustrative working example, with reference to FIG. 1 and FIG. 2 generally, an electronic lock 100 can comprise a housing 102 having a lock aperture 106 extending through a face thereof. The lock aperture 106 is configured to receive a locking mechanism, such as a clasp, shackle, etc. as described more fully herein. A biometric interface 110 is attached to the housing 102. Moreover, a locking system is contained within the housing 102. The locking system comprises a controller 202. The locking system also includes a biometric reader 204 that is electrically coupled to the controller 202. The biometric reader 204 is also electrically coupled to the biometric interface 110. A lock transitions between a locked position and an unlocked position such that when the lock is in the locked position and the locking mechanism is inserted into the lock aperture, the locking mechanism is locked to the housing. Correspondingly, when the lock is in the unlocked position, the locking mechanism can release from the housing.

An electric actuator 212 is electrically coupled to the controller 202. The electric actuator 212 is operable to transition the lock between the locked position and the unlocked position. A battery 220 powers at least the controller 202, the biometric reader 204, and the electric actuator 212. Here, the controller 202 issues an electronic unlock command signal to the electric actuator 212 to cause the lock to transition from the locked position to the unlocked position upon determining agreement of a match of electronic data corresponding to a biometric read by the biometric reader to biometric data accessible by the controller 202 identifying an authorized user (such as a library containing one or more authorized user electronic biometric signatures). Also, the controller 202 issues the unlock command signal to the electric actuator 212 to cause the lock to transition from the locked position to the unlocked position where a measure of a battery characteristic falls below a predetermined threshold, independent of an output of the biometric reader 204.

Unlock Algorithm

Figure 3:
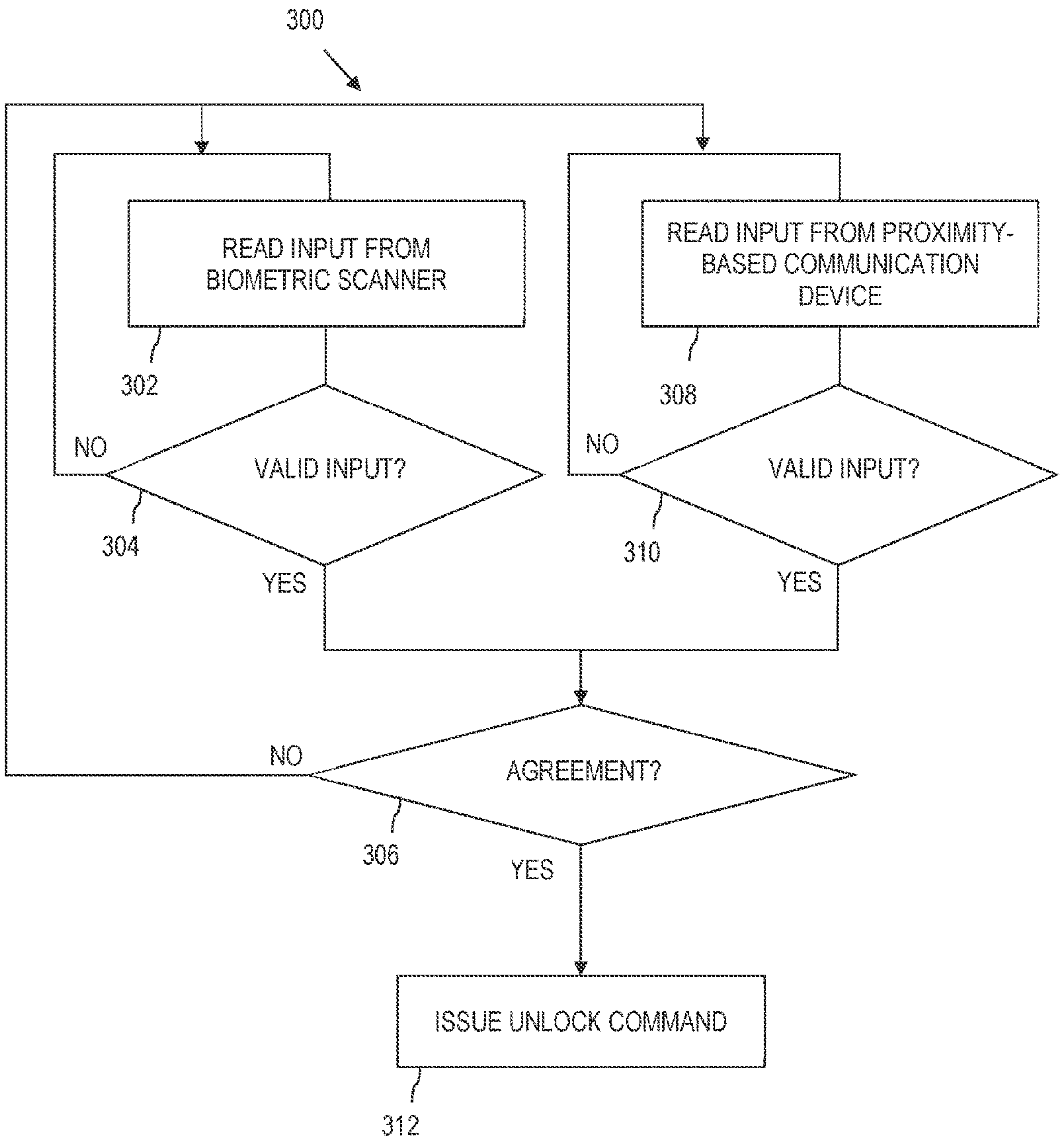
FIG. 3 is a flow chart illustrating an example algorithm that can be executed by the controller of FIG. 2 to issue an unlock command, according to aspects of the present disclosure.

Referring to FIG. 3, a flow chart illustrates an example algorithm 300 that can be programmably implemented by the controller 202 (FIG. 2) in order to issue an unlock signal, e.g., to cause the lock 208 (FIG. 2), to unlock electronically. In this example embodiment, the controller 202 requires a multi-part confirmation that an individual has proper permission to unlock the electronic lock. In the illustrative example, a two-part authentication is required, including authentication by a biometric scanner and input by a proximity-based communication device. In this regard, the controller 202 may not care the order in which the inputs are received. As such, FIG. 3 illustrates receiving an input from a biometric scanner and from a proximity-based communication device in parallel indicating that a user can enter a biometric first, interact with the proximity-based communication device first, or interact with both at the same time.

At 302, the algorithm receives an input from a biometric scanner, e.g., the biometric reader 204 (FIG. 2). In practical applications, the input is a biometric from a user wishing to unlock the electronic lock. Here, the biometric scanner compares the biometric received from the user to one or more biometric signatures that have been predetermined as authorized to unlock the lock. By way of example, a user may have placed a finger on a fingerprint pad. Responsive thereto, the device reads the user's fingerprint. The read fingerprint is converted into electronic data that is compared to electronic data such as fingerprint signatures, e.g., which can be stored in memory accessible by the controller, the biometric interface, or both.

At 304, the algorithm determines whether the biometric is a valid input. For instance, the biometric scanner may attempt to match the biometric of the user to one or more stored biometric signatures. If the input is not valid, then the process loops back to obtain an input. Alternatively, if a valid input is received, the controller considers whether the controller has also received a valid input from the proximity-based communication device. If a valid input is not received from the proximity-based communication device (Agreement at 306 is NO), then the process again loops back for a user input.

Analogously, at 308, the algorithm receives an input from the proximity-based communication device. As noted more fully herein, the proximity-based communication device may comprise a Near Field Communication Device, Bluetooth Device, RFID device, FOB, UWB, Zigbee, etc. A check is made at 310 as to whether the input is valid. If the proximity-based communication device does not authenticate a valid input, (Valid Input is No at 310), then flow returns to the beginning to receive an input.

The proximity-based communication device can perform a number of authentication functions. For instance, the proximity-based communication device may require that an associated known device pairs or otherwise communicates therewith. Here, a valid user must possess a corresponding, separate device that is known to the proximity-based wireless communication device. As another example the proximity-based communication device may require a passcode, key, pin, or other electronic input, which can be input or otherwise provided by a user, e.g., interacting with the electronic lock itself (e.g., via the input/output 114, FIG. 1), or via a separate device that communicates with the proximity-based communication device (not shown).

Alternatively, if a valid input is received, the algorithm considers whether a valid input has been received from the biometric scanner. If a valid input is not received from the biometric scanner (Agreement at 306 is NO), then the process again loops back for a user input.

If a user identification is presented to both the biometric scanner at 302 and at the proximity based communication device at 308 (e.g., within a predetermined time period of one another), then the algorithm determines at the Agreement box 310, whether the biometric scanner and the proximity based communication device identify the same user, or whether the biometric scanner and the proximity based communication device identify different users.

In some embodiments, agreement must be from the same user. In other embodiments, agreement requires that the user that authenticates with the biometric reader and the user that authenticates with the proximity-based communication device are different, but known and associated people. Regardless, if there is no Agreement at 310 between the user identified by the biometric scanner and user identified by the proximity-based communication device at 310, the process loops back to the beginning to obtain one or more inputs as described more fully herein.

Alternatively, if there is Agreement at 310 between the user identified by the biometric scanner and user identified by the proximity-based communication device at 310 (e.g., within the predetermined time period of one another), then control continues to 312, where the controller issues an unlock command, e.g., to the lock 208 by way of example. Here, the predetermined time required for agreement can range from a few seconds to a few minutes, for example.

Thus, according to the algorithm 300 of FIG. 3, the controller issues an unlock command signal, e.g., to the electric actuator, to cause the lock to transition from the locked position to the unlocked position upon determining agreement of a multi-part electronic verification. Here, the multipart verification comprises a match of a biometric read by the biometric scanner to an authorized user, and a match of an identifier read by the proximity-based wireless communication device to stored identity data accessible by the controller identifying an authorized user, e.g., to the same authorized user matched by the biometric reader.

In an example embodiment, the proximity-based wireless communication device is implemented by at least one of a nearfield electronic communication (NFC) reader that communicates with a corresponding NFC tag, and a Bluetooth receiver that is configured to only pair with authorized users. Moreover, in these embodiments, the locking mechanism can comprise a zipper clasp. Here, the lock comprises a locking member that restricts the clasp, when inserted into the lock aperture, from being removed when the lock is in the locked position. As another example, the locking member can restrict at least one of a shackle, hook, or bolt inserted into the lock aperture from being removed when the lock is in the locked position.

Notably, even with multi-part authentication, in some embodiments, the lock can be controlled to transition from the locked position to the unlocked position by the mechanical key receiver engaging a physical key independent of the unlock command signal from the controller.

In practical applications, two independent verification mechanisms may be sufficient. However, it is possible to incorporate more and/or alternative verification mechanisms. In this regard, the algorithm 300 can be altered in to include additional, different, or fewer authentication mechanisms.

As a first example, where a proximity-based communication device is not provided, the system my authenticate based upon the input from the biometric scanner alone. Here, the agreement at 306 is assumed to be satisfied if the input is valid at 304.

Analogously, as a second example, where a biometric scanner is not provided, the system my authenticate based upon the input from the proximity-based communication device alone. Here, the agreement at 306 is assumed to be satisfied if the input is valid at 310.

As yet another example, a system may include both a biometric scanner and one or more proximity-based communication devices, or multiple different proximity-based communication devices. Here, the controller need only account for a valid input from one device, or validation may be required from multiple devices, e.g., depending upon the desired implementation.

Thus, the algorithm 300 can be modified to not require two-part authentication. Rather, the Agreement decision logic 306 may be optional. As a result of such a modification, the controller issues an unlock command signal to cause the lock to transition from the locked position to the unlocked position in a manner that is independent of the mechanical key receiver (when a mechanical unlock is provided), and is based upon at least one electronic verification selected from a match of a biometric read by the biometric reader to an authorized user at 302, 304 or a match of an identifier read by the proximity-based wireless communication device an authorized user at 308, 310.

As yet further examples, either of the above-described embodiments can replace the proximity-based communication device and/or biometric reader scanner. For instance, the proximity-based communication device and/or biometric scanner can be replaced by a user interface on the electronic lock that requires a pin code or other unique user input. As yet further examples, the proximity-based communication device and/or biometric scanner can be replaced by another electronic component (or components), e.g., Bluetooth, UWB, Zigbee, Wi-Fi, a GPS receiver, other global or local positioning system, etc. Yet further, multiple "channels of authentication" (e.g., any described technology herein for communication, user interaction, etc., such as user I/O, Bluetooth, Wi-Fi, Zigbee, NCF, GPS, etc.,) can be provided, where agreement of n channels is required for the controller to issue an unlock command, where n is any whole number greater than 0 (i.e., one or more). Thus, for instance, there may be 3-4 ways to authenticate, of which two or more authentications must match in order for the controller to issue an unlock command.

Moreover, some secondary authentications can be automated. For instance, if an authorized user places a fingerprint on the biometric scanner (e.g., fingerprint reader), the controller may then try to obtain a confirmation of user identify automatically by checking a geo-location, by looking for a Bluetooth device, smartphone, etc., known to be associated with the user, try to read an NCF or other badge or tag, associated with the user, etc. In other embodiments, e.g., where security is more of an issue, the user may be required to actively participate in the dual verification, e.g., by physically touching an NCF device to the housing of the electronic lock, by responding to a message transmitted by the electronic lock over Wi-Fi or Bluetooth to the user's smartphone, by requiring the user to enter a pin on the electronic lock housing, by requiring the user to enter a pin on an associated smartphone, by responding to an email or app push request, text request to a smartphone texting app, etc.

In some embodiments, if the controller detects a predetermined number of illegal identification attempts, the controller may issue a lockout such that an owner is required to reset the controller, e.g., by requiring a supervisor/administrator login, e.g., via a specific user account, the user may be required to reset the lock using the physical key, etc.

In some embodiments, the algorithm 300 can be modified to provide a number of additional features that can enhance the flexibility of the lock. For instance, there is no strict requirement that the user that enters a biometric is the identical person the provides an input via the proximity-based communication device. For instance, there may be a situation where it is desirable to require two individuals to unlock the lock. As yet another example, a single individual can use the biometric scanner for multiple different inputs. For instance, the user may be required to scan two or more fingers, which may result in different signatures for each finger, etc. The biometric scanner can be utilized in other ways, examples of which are set out in greater detail herein. Here, there may be multi-part authentication for each user, or two or more individuals can split ownership of a different component of the multi-part authentication.

Electronic Lock Example C

Referring to FIG. 4, an example block diagram of an electronic lock 400 is illustrated. The electronic lock 400 is analogous to the electronic lock 200 of FIG. 2. As such, like elements are indicated with like reference numbers 200 higher than counterpart elements. As such, a detailed explanation of analogous components is not discussed in detail herein.

As with the block diagram of FIG. 2, the electronic lock 400 includes a controller 402, a biometric reader 404, a proximity-based wireless communication device 406, a lock 408, a power supply 420, etc. These components can be analogous to their dual in FIG. 2. Moreover, the electronic lock 400 can implement any of the processes herein, including the processes described with reference to FIG. 3.

However, FIG. 4 illustrates memory that can store, among other electronic data, a user list 430. Here, the memory, and hence the electronic user list, is communicably coupled to the controller 402. The controller 402 can access data stored in the user list 430 to determine, for example, whether a valid input indicating an authorized user is received from the biometric scanner (see 304 of FIG. 3), whether a valid input indicating an authorized user is received from the proximity-based communication device (see 310 of FIG. 3), combinations thereof, etc. As a few illustrative examples, the user list 430 can store biometric signatures, e.g., fingerprint signatures, where each fingerprint signature is associated with a unique authorized user. The user list 430 can also store electronic identity data, e.g., identifiers that are associated with the corresponding proximity-based communication device, PIN codes, electronic keys, electronic passwords, etc., signatures, etc. The ability to correlate and normalize different authentication technologies to a common user list allows multi-part authentication to be carried out efficiently on the device itself.

In practical applications, there are a number of ways to program the user list 430. A user list can be uploaded into a local database via a hardware connector, e.g., USB (not shown for clarity). As another example, the user list can be uploaded via wireless, e.g., via connection to a network, e.g., WI-FI, e.g., using a smartphone, computer, etc. Still further, the controller 402 can run an algorithm that implements a secure administrative mode where the controller 402 itself builds a valid user list and associates each valid user with a unique biometric signature and with a unique input via the proximity-based communication device.

Electronic Lock Example D

Referring to FIG. 5, an example block diagram of an electronic lock 500 is illustrated. The electronic lock 500 is analogous to the electronic lock 400 of FIG. 4 and/or the electronic lock 200 of FIG. 2. As such, like elements are indicated with like reference numbers 300 higher than counterpart elements in FIGS. 2, and 100 higher than the counterpart elements in FIG. 4. As such, a detailed explanation of analogous components is not discussed in detail herein.

As with the block diagram of FIG. 4, the electronic lock 500 includes a controller 502, a biometric reader 504, a proximity-based communication device 506, a lock 508, power supply 520, and a user list 530. These components can be analogous to their dual in FIG. 4. Moreover, the electronic lock 500 can implement any of the processes herein, including the processes described with reference to FIG. 3.

However, FIG. 5 adds a Bluetooth transceiver 532. The Bluetooth transceiver 532 can function in a number of capacities. The Bluetooth receiver can function as a short-range transceiver for programming and communication. Alternatively, the Bluetooth transceiver can function in lieu of, or in addition to the proximity-based communication device 506 for multi-part authentication. For instance, Bluetooth transceiver transactions can replace the proximity-based communication device transactions in the algorithm of FIG. 3. Alternatively, a three-way authentication can be carried out by expanding the algorithm of FIG. 3 to accommodate the Bluetooth transceiver input analogous to the biometric input (302, 304) and/or the proximity-based communication device input (308, 310), or the Bluetooth transceiver can function in lieu of the biometric scanner, proximity-based communication device, etc.

Electronic Lock Example E

Referring to FIG. 6, an example block diagram of an electronic lock 600 is illustrated. The electronic lock 600 is analogous to any combination of disclosure for the electronic lock 200 of FIG. 2, electronic lock 400 of FIG. 4, or electronic lock 500 of FIG. 5. As such, like elements are indicated with like reference numbers 400 higher than the counterpart elements in FIG. 2, 200 higher than the counterpart elements in FIGS. 4, and 100 higher than the counterpart elements in FIG. 5. As such, a detailed explanation of analogous components is not discussed in detail herein.

As with other electronic locks described more fully herein, the electronic lock 600 includes a controller 602 (which can execute the algorithm 300 of FIG. 3) and a biometric reader 604. The electronic lock 600 also includes a lock 608, power supply 620, and a user list 630. Moreover, the electronic lock 600 can implement any of the processes herein, including the processes described with reference to FIG. 3.

The electronic lock 600 can also include one or more communication devices as noted more fully herein. For convenience of illustration, the device(s) are illustrated in block 634. Here, the communication device(s) can include NCF, Bluetooth, UWB, Zigbee, Wi-Fi, a combination thereof, etc.

The electronic lock 600 also includes a positioning system 636, which can be implemented as a global positioning system (GPS), a local positioning system, etc. The incorporation of a GPS enables the electronic lock to implement geo-based decisions into the algorithm that determines whether to issue an unlock command to the lock 608. For instance, geo-fences can be set up that require the electronic lock 608 to be outside of defined geographical region(s) in order for algorithm to issue the unlock command. Likewise, the positioning system 636 can be used to set up geo-containment regions, where the electronic lock 600 must be within a predefined geo-boundary in order for algorithm to issue the unlock command.

Notably, other metadata can be used with or in lieu of geo-based data to augment the algorithm 300 in order for algorithm to issue the unlock command. For instance, an administrator may set up the electronic lock 600 to open only within set hours, on set days, etc. Geo-requirements and metadata requirements can be in addition to, or part of the required n part authentication described more fully herein.

As a few examples, the electronic lock can include a global positioning system (GPS) receiver that is controlled by the controller to determine the position of the electronic lock when an attempt is made to unlock the lock. In some embodiments, the controller reads a list of geoboundaries to determine whether multi-part electronic verification is required. For instance, if a user is within a geofenced area such as a public area, a multi-part verification may be required. As yet another example, if the user is in a geofenced area such as a safe area, then multi-part verification can be disabled.

By way of illustrative example, the controller can be programmed with at least one approved geoboundary. Here, the controller issues an unlock command signal, e.g., to the electric actuator, to cause the lock to transition from the locked position to the unlocked position from any one of the authorization devices provided, such as a fingerprint scanner or the proximity-based wireless communication device, when the controller determines from the GPS receiver that the electronic lock is in a predetermined approved geoboundary. The controller can require a multi-part electronic verification to issue an unlock command signal, e.g., to the electric actuator, to cause the lock to transition from the locked position to the unlocked position when the electronic lock is not within the predetermined approved geoboundary. In other embodiments, the above-two roles can be flipped. For instance the controller issues an unlock command signal, e.g., to the electric actuator, to cause the lock to transition from the locked position to the unlocked position from any one of the authorization devices provided when the controller determines from the GPS receiver that the electronic lock is not in a predetermined approved geoboundary. The controller can require a multi-part electronic verification to issue an unlock command signal, e.g., to the electric actuator, to cause the lock to transition from the locked position to the unlocked position when the electronic lock is within the predetermined approved geoboundary.

The electronic lock 600 also is illustrated as having a device port 638. The device port 638 can comprise a universal serial bus (USB) port, etc. The device port 638 can function to recharge a battery (e.g., the power supply 620) that powers the electronic lock 600. The device port 638 can also be used to power the electronic lock 600, e.g., in case the battery wears down too far to be useful. Still further, the device port 638 can be used to load data, e.g., into the user list 630. Moreover, the device port 638 can be used to extract information from the electronic lock 600.

For instance, the electronic lock 600 can log authorization attempts, e.g., to capture data on when the lock is accessed. The electronic lock can also use the positioning system to tag authorization attempts with geo-data such that records can be created that reflect not only that the lock was accessed, but by whom and where.

The electronic lock 600 can also include one or more input/output devices (I/O) devices 640. Example I/O devices include a speaker, a microphone, a haptic device, a transducer, a piezo element, light, LED, display, etc. In the example embodiment, the I/O device 640 is coupled to the controller 602, thus enabling the controller 602 to interact with the I/O device 640 and to coordinate the I/O device 640 with other features of the electronic lock 600.

By way of example, an I/O device 640 implemented as microphone, coupled with voice recognition software executing in the controller 602 enables voice activation of an unlock command. Here, the user can train the controller 602 to respond to a voice command to cause the controller to unlock the lock 608. In some embodiments, a voice command can also (and/or alternatively) be used to cause the controller 602 to cause the lock 608 to transition to a locked position. The voice commands can also optionally be utilized to turn on or off certain features, e.g., to enable or disable the biometric scanner, Bluetooth, GPS, NFC, or other features provided on the particular device 600. Still further, a pre-designated command can cause the controller to start listening for voice commands. For instance, a command such as "hey lock" may trigger the lock to start listening for a voice command. In this regard, the controller can be programmed to listen for identifying characteristics of a voice signal (e.g., authenticate) based upon verbal characteristics. The controller can also be programmed to listen for certain words, sounds, or combinations thereof. The command words can be buried in a sentence, thus masking the true trigger words. In this regard, the controller can record across a time window, then parse the recorded speech to look for trigger words, sounds, etc.

As yet another example, an I/O device 640 can be an LED and/or LED and speaker/transducer. Here, the controller is programmed to respond to a user request to find the lock. Thus, the LED can be programmed to turn on, flash, change color, etc., to send a "beacon". The I/O device 640 can also play a sound, e.g., chirp, alarm, etc. to assist with location of the electronic lock 600.

In yet another example, a smartphone can connect to the lock, e.g., via Bluetooth, ultra-wide band, WiFi, USB, or other wired or wireless technology. In this implementation, the lock includes the appropriate transceiver, USB interface, etc., to communicate with the smartphone. In a manner analogous to the voice example above, a smartphone microphone is coupled with voice recognition software executing in the smartphone, e.g., via an app, to enable voice activation of an unlock command. Here, the user can train the voice software in the app to respond to a voice command to cause the controller 602 to unlock the lock 608. In some embodiments, a voice command can also (and/or alternatively) be used to cause the controller 602 to cause the lock 608 to transition to a locked position. The voice commands can also optionally be utilized to turn on or off certain features, e.g., to enable or disable the biometric scanner, Bluetooth, GPS, NFC, or other features provided on the particular device 600. Still further, a pre-designated command can cause the controller to start listening for voice commands. For instance, a command such as "hey lock" may trigger the smartphone app to start listening for a voice command. In this regard, the smartphone app can be programmed to listen for identifying characteristics of a voice signal (e.g., authenticate) based upon verbal characteristics. The smartphone app can also be programmed to listen for certain words, sounds, or combinations thereof. The command words can be buried in a sentence, thus masking the true trigger words. In this regard, the smartphone app can record across a time window, then parse the recorded speech to look for trigger words, sounds, etc.

In yet further example embodiments, a smartphone can be used to augment the controller, e.g., controller 602, and/or other components of the lock. For instance, a user may be required to enter a biometric signature. However, an app on the smartphone includes the same signature library (or subset of the same signature library) as the lock. As such, the app on the smartphone can use a biometric scanner on the smartphone to read a biometric signature in addition to, or in lieu of the biometric scanner on the lock. In other example, the smartphone can use its transceiver, e.g., WiFi transceiver, to receive software updates, etc., which can then be loaded into the controller 602. In yet another example, the controller in the lock can communicate with the smartphone app to carry out enhanced features. For instance, the lock may not include a built-in GPS, but rather rely on the smartphone GPS and smartphone computing power to carry out any one or more of the geofeature capabilities described more fully herein. In this example, the lock can leverage the graphical user interface, including the touchscreen, and computer processing power of the smartphone to offload data intensive processing, which saves energy, prolongs battery life, and requires less computational capability on the lock. Here, if the lock receives an input indicating that the controller should issue an unlock command, the controller on the lock first communicates with the smartphone app, e.g., to check whether the unlock command was received within the requirements of geoboundaries, whether the necessary authentication is satisfied, etc.

Yet further, in some embodiments, a user can set a unique pairing requirement for the controller in the lock to pair with a smartphone. This allows the user to ensure that pairing can be securely and reliably made with the lock. By way of example, when using Bluetooth, the user can set a unique discovery parameter (e.g., a passkey, PIN, passcode, password, or other security code) that the Bluetooth receiver on the lock requires before successful pairing. When the user attempts to pair with the lock, after discovering the lock, the lock will require the user to enter the correct discovery parameter. Because the discovery parameter is set by the user of the lock, the user can pair any smartphone. Thus for example, if a user smartphone is not charged, or not in the user's possession, and the user needs to use a smartphone to unlock the lock, the user can borrow a smartphone from a trusted source, pair the new smartphone, download any necessary app, and use the app on the borrowed smartphone to cause the controller to issue an unlock command to the lock system.

In yet further aspects of the present disclosure, because the controller of the lock integrates with a smartphone, e.g., to offload technology and/or software processing, the same or similar functionality can be passed to other electronic peripherals/accessories. For instance, in some embodiments, the lock can be controlled to issue an unlock command responsive to a command received from a smartwatch.

In still further embodiments, a smartphone acts as a graphical user interface to pass key information to the user, e.g., the controller of the lock sends messages to an app in the smartphone (e.g., directly or via a cloud infrastructure), to show battery level, access details, lock status (e.g., locked, unlocked), etc. As another example, the app on the smartphone can act as a "finder" by finding the lock, e.g., based upon GPS, wireless communication, or a combination thereof.

The smartphone app can also be programmed to carry out certain lock or unlock functions automatically or via user interaction, e.g., based upon proximity to the lock. For instance, in an example embodiment, an alarm is triggered by the smartphone when the lock exceeds a predetermined range, distance, etc., from the smartphone app. By way of example, a received signal strength indicator (RSSI) can be used as an estimated distance of the lock from the smartphone. In addition to the alarm, the smartphone app can automatically send a command to cause the lock to lock itself where the lock design makes this automatable. Also, the smartphone capability described herein can augment, override, or be overridden by the normal capability of the lock. For instance, in some embodiments, the lock will normally automatically unlock just before the battery is discharged too low to be able to respond to commands. However, if the smartphone app detects that the lock is not within a predetermined range, then this normal unlock sequence can be overridden so that the lock does not automatically unlock. This smartphone override may be geobounded, e.g., so that when the lock is within a defined geoboundary, e.g., a user's home, the lock will simply unlock if the battery gets too low. On the other hand, when the lock is in another geoboundary, e.g., designated geolocation such as a public location, or if the lock is outside a designated "safe" geoboundary, then smartphone and lock interact so that the lock does not automatically unlock if the battery on the lock gets too low.

Miscellaneous

Various embodiments are illustrated, to demonstrate features of an electronic lock. In practice, an electronic lock according to aspects herein, can be implemented using any one or more features described with reference to any one or more of the FIGURES generally. Thus, each FIGURE represents a non-limiting example embodiment comprised of several components, processes, etc., that can be combined with features such as components, processes, etc., from other embodiments herein. For instance, an authentication device such as the GPS device 636 can be implemented with the configuration of FIG. 2, FIG. 4, FIG. 5, etc.

As another illustration, an example embodiment of an electronic lock can comprise a housing having a first face, a lock aperture that extends through the first face of the housing, a keyhole that passes through the housing, and a biometric interface attached to the housing. The housing contains, for example, a controller, a biometric reader electrically coupled to the controller, and a proximity-based wireless communication device electrically coupled to the controller. Also, a lock transitions from a locked position to an unlocked position in cooperation with a locking mechanism that is insertable into the lock aperture. For instance, the lock can include a locking member that restricts a zipper clasp inserted into the lock aperture from being removed when the lock is in the locked position, a locking member that restricts at least one of a shackle, hook, or bolt inserted into the lock aperture from being removed when the lock is in the locked position, etc.

Yet further, a mechanical key receiver is configured to accept a physical key. Under this arrangement, the controller can issue an unlock command signal to cause the lock to transition from the locked position to the unlocked position in a manner that is independent of the mechanical key receiver, based upon at least one electronic verification selected from a match of a biometric read by the biometric reader to electronic data identifying an authorized user, or a match of an identifier read by the proximity-based wireless communication device (e.g., a nearfield electronic communication (NFC) reader that communicates with a corresponding NFC tag, a Bluetooth receiver that is configured to only pair with authorized users, etc.) to electronic data identifying the authorized user. Moreover, the lock is controlled to transition from the locked position to the unlocked position by the mechanical key receiver engaging a physical key independent of the unlock command signal from the controller. In some embodiments, there can be both a first proximity-based wireless communication device, such as a nearfield electronic communication (NFC) reader that communicates with a corresponding NFC tag, and a second proximity-based wireless communication device, such as a Bluetooth receiver. As noted more fully herein, the electronic lock can include an authentication device such a positioning system, e.g., a global positioning system (GPS) receiver that is controlled by the controller to determine the position of the electronic lock when an attempt is made to unlock the lock, as set out more fully herein.

However, other combinations of features described herein can be combined to form an electronic lock. By way of example, an electronic lock could include the GPS 636 of FIG. 6, and the proximity-based wireless communication device 406 of FIG. 4, but omit a biometric reader all together.

With reference to the FIGURES generally, the example technologies described herein can be used in various ways to cause the controller to issue an unlock command. For example, the controller can respond to a PIN (e.g., personal identification code) as a way to establishing authentication to issue an unlock command. The PIN can be a sequence, pattern, or other code entered into a smart device, e.g., smartphone. In the case of a smart device running an app, a PIN can be used in addition to, or in lieu of pressing an "unlock" virtual button on a graphical user interface of the smart device. Here, the PIN can be any combination of alpha numeric or special characters.

The PIN can also/alternatively be implemented using coded pulses, e.g., analogous to Morse code. The code entry can be implemented by tapping the biometric reader, e.g., biometric reader 204. In this manner, instead of reading an actual biometric input, the biometric reader detects activation, and sends a signal to the controller. The controller is programmed to "listen" for a series of pulses or activations, and convert those received serial pulses or activations into a PIN. If the interpreted pattern matches a pre-stored pattern, then the controller can send an unlock command. Thus, for example, determining agreement of a match of electronic data corresponding to a biometric read by the biometric reader to data identifying an authorized user can comprise collecting the data corresponding to a biometric read by the biometric reader by collecting a series of taps on the biometric reader, thus forming a PIN and comparing the determined PIN to the data identifying the authorized user.

With the above in mind, yet another example implementation of an electric lock comprises a housing having a lock aperture extending through a face thereof, and a biometric interface attached to the housing. Also, a locking system is contained within the housing. Here, the locking system comprises a controller. The locking system also includes one or more authentication devices. For instance, the locking system includes a biometric reader electrically coupled to the controller and to the biometric interface. A lock transitions between a locked position and an unlocked position such that when the lock is in the locked position and the locking mechanism is inserted into the lock aperture, the locking mechanism is locked to the housing and when the lock is in the unlocked position, the locking mechanism can release from the housing. Responsive thereto, an electric actuator is electrically coupled to the controller, and is operable to transition the lock between the locked position and the unlocked position. Under this configuration, the controller issues an electronic unlock command signal, e.g., to the electric actuator, to cause the lock to transition from the locked position to the unlocked position upon determining agreement of a match of electronic data corresponding to a biometric read by the biometric reader to data identifying an authorized user or detecting that the user tapped a PIN into the biometric interface that matches a PIN corresponding to the user, where the PIN is stored in memory accessible by the controller.

This same concept can be applied to other input devices. For instance, instead of the controller using voice commands per se, a user could tap on the microphone to send a pattern of touches. The controller listens to the pattern of taps and if the interpreted pattern matches a pre-stored pattern, then the controller sends an unlock command to the lock. Instead of tap or in addition to taps, a microphone can use utterances, pitch, duration volume, or a combination thereof to assemble a pattern into an input that can be matched to a pre-stored value representing an authorization, and trigger an unlock command. Still further, a PIN code can be tapped into graphical user interface on a smartphone that is linked to the lock, e.g., via Bluetooth, WiFi, ultrawide-band, etc.

A related approach can be taken with location sensing features, such as GPS. The user can program a geo-location as a lock or unlock position. Yet further, the other devices connected to the controller can be converted into PIN code generators using techniques analogous to that described above. This allows features provided in an electronic lock to serve multiple purposes, including use as a PIN generator in addition to, or in lieu of using an associated device in its normal capacity as described more fully herein.

Yet further, as noted in greater detail herein, a user possessing a smart device, e.g., smartphone, smartwatch, smart fitness tracker, tablet, laptop, etc. can link the smart device to the electronic lock, e.g., via Bluetooth, WiFi, ultra-wide band, etc. Using a technology such as UWB allows the controller to be programmed with rules that affect wither the controller will issue an unlock command. For instance, ultra-wide band, Bluetooth, WiFi, and similar technologies can sense the presence of an external device without actually communicably pairing or connecting with that external device. As such, the controller can be programmed, e.g., via a user interface on a smart device (e.g., smartphone, smart watch, smart appliance, etc.) or computer, to only issue an unlock command if the user authenticates to the controller (e.g., using a technique(s) described more fully herein) and a particular external device or devices (e.g., different from, the user's smart device) is/are either present, or not present. For instance, if the controller detects that the user is home, a home WiFi router may be broadcasting a WiFi network name that is recognized by the controller. The controller can use the detection of the WiFi as a sort of inferential positioning system to know that the user is in a familiar setting, thus authorizing an unlock command. Many other examples can be implemented based upon the disclosure herein.

The user can also pair a smart device such as a smartphone to the electronic lock. Under this configuration, using GPS, Bluetooth, ultra-wide band, Wi-Fi, etc., in either the electronic lock, the smartphone, or both, the controller can determine whether the electronic lock is within a predefined geo-boundary of the smartphone. In this regard, the controller is programmed with a rule that causes the controller to not send an unlock command to the electronic lock if the electronic lock is outside the defined geo-boundary.

In still another example embodiment, the controller is programmed to utilize signal strength, e.g., via a received signal strength indicator (RSSI) or other measure of power, signal strength or other measurable parameter.

Also, as described more fully herein, the controller can issue an unlock command based upon a predefined authentication. The authentication can, in some embodiments, come from one feature/modality (e.g., biometric input, smart device pairing, PIN code entry, etc.). In other embodiments, the controller is programmed by a rule that provides a predefined authentication based upon multi-technology/multi-modal verification, e.g., NFC plus smart device pairing, or any two or more modalities/features described herein, etc.). In still further embodiments, the controller is programmed with a rule that defines authentication based upon single feature/modality or multi-feature/modality plus external environment criteria, e.g., and not in a predefined geo-boundary (and not at the park), within a predefined geo-boundary (e.g., in my car, at my house, etc.), and within the presence of an external device, and only if not in the presence of a known external device, etc.

Still further, where the controller has access to memory, the controller can store metrics, including successful unlocks, failed attempts, timestamps and other meta data, which can be exported to a smartphone, e.g., either directly or via a cloud based data gathering process.

In some embodiments, the controller can include a boot loader or other feature that allows a smart device, computer, etc., to flash the electronic lock with a software update, e.g., to change firmware.

Yet further, as best illustrated in FIG. 6, in some embodiments, the controller 602 can communicate with the power supply 620, e.g., with a power supply sensor. Thus, for example, the controller 602 can monitor a battery characteristic, such as battery charge. In this regard, when the battery falls below a certain charge, e.g., a first threshold such as 10% battery remaining, the controller 602 sends a message, e.g., a tone, light indicator, email or text to the user's smart phone, etc.) to the user that the battery needs recharged. If the battery level falls below a second threshold level, e.g., 5%, the controller 602 opens the lock in some embodiments. In the present example, the measure of battery characteristic (e.g., charge) is evaluated against predetermined threshold(s) (e.g., first threshold and second threshold) as a percentage of predicted charge remaining. However, other suitable measures can also be implemented.

Here, the controller 602 can provide feedback via multiple modes, e.g., by controlling an LED (e.g., I/O 640) to flash or change color when the battery level crosses the first threshold indicating the need to be recharged, or the second threshold indicating the need to either secure the lock in the locked state (or alternatively, to unlock the lock) depending upon the user configuration. The percentage given for the first and second thresholds are by way of example only. Other values can be utilized instead.

Referring to the FIGURES generally, as a few additional non-limiting but illustrative examples, a clasp can be received into a lock aperture (e.g., lock aperture 106, FIG. 1) and is released by a mechanism, e.g., a spring-loaded release. As another illustrative example, a zipper and lock can comprise magnets, where the magnets are attracted to the lock aperture 106. In yet another example, a hook can insert into the lock aperture 106 and is turned by a lock mechanism, thus releasing a zipper, hook or other suitable structure from the lock aperture 106. As yet another example, a snap can be connected to the lock either by magnet or by a small hole inside the snap. Here, the magnet will be released when a magnetic attraction is overcome. A snap with a small hole therein can be connected to the lock. Here, the lock includes a rod that goes in the lock aperture 106, keeping the snap secure. The mechanisms herein pull the rod out of the snap upon receiving an unlock command, allowing the snap to be released. Thus, the user always has the ability to snap. However, the electronic lock can turn on and off the locking mechanism.

Example Zipper Lock

Referring now to FIG. 7, an example electronic lock 700 is illustrated. The electronic lock 700 can, in practice, include any combination of features described herein. For sake of clarity of discussion, the illustrated electronic lock 700 includes a housing 702 having a first face 704 that defines a major surface facilitating interaction with the electronic lock 700. The housing 702 is shown with a generally "box" shaped form factor solely for convenience of illustration and discussion of key features herein. In practice, the housing 702 can take on any shape and/or size, e.g., to conform to intended applications, technology contained therein, aesthetics, combinations thereof, etc.

In practical applications, one or more features of the electronic lock 700 are exposed to a user via the housing 702. For instance, as illustrated in the example electronic lock 700 of FIG. 1, a lock aperture 706 extends through the first face 704 of the housing 702. The lock aperture 706 defines an opening in the electronic lock 700 that receives a corresponding locking member, which is illustrated as a zipper clasp 707 in this example.

The electronic lock 700 can include an optional keyhole 708 that passes through the housing 702. In the embodiment shown in FIG. 8, the optional keyhole 708 extends through the first face 704 of the housing 702. However, in other embodiments, the keyhole 708 can extend through or otherwise couple to any other surface of the housing 702, e.g., back, side, etc. Regardless of location, the keyhole 708, where utilized, provides an interface that receives a physical key that is specifically configured to unlock/open the locking mechanism of the electronic lock 700. As will be described in greater detail herein, the physical key operates the locking mechanism independent of an electronic locking mechanism. Likewise, the electronic locking mechanism can unlock the lock independent of the physical key. As a result, the electronic lock 700 can always be opened, even where no power is available to the electronic lock 700. In some embodiments, the keyhole 708 can be omitted.

Still further, a biometric interface 710 is attached to or otherwise passes through the housing 702. In the embodiment shown in FIG. 7, the biometric interface 710 is attached to or otherwise extends through the first face 704 of the housing 702. However, in other embodiments, the biometric interface 710 can attach to or otherwise extend through any other surface of the housing 702. Regardless of location, the biometric interface 710 receives biometric information from a user. In some embodiments, the received biometric information can be used to unlock the electronic lock 700. In other embodiments, the received biometric information can be used to lock the electronic lock 700. In still further embodiments, the received biometric information can be used as a part of a multi-part authentication, verification, other scheme, etc., examples of which are set out in greater detail herein.

In practical applications, the biometric interface 710 can form part of a fingerprint/thumbprint scanner. In this regard, the biometric interface 710 can optionally include a pad 712. The pad 712 provides an interface for receiving a biometric input from a user, receive a tapped in PIN from a user, or combination thereof, as set out in greater detail herein. However, other biometric-based sensing technologies can also/alternatively be utilized.

As noted more fully herein, the electronic lock 700 can include other electronic identification features in addition to, or in lieu of the biometric interface 710, e.g., NCF, Bluetooth, Ultra-wide band, etc.

Optionally, the electronic lock can also include one or more user interface input/output features. The input/output 714 can include one or more buttons, pads, knobs, encoders, switches, Light Emitting Diodes (LEDs) or other input and/or output devices that facilitate user interaction with the lock.

Referring to FIG. 8, a zipper clasp 800 is illustrated in a perspective view. The zipper clasp 800 can implement the zipper clasp 707 in FIG. 7 for instance. The zipper clasp 800 includes in general, a zipper attachment 802 that attaches to a zipper of a corresponding article, e.g., a bag, purse, backpack, carry case, pouch, etc. A zipper handle 804 couples to the zipper attachment 802 for grasping by a user. A zipper lock arm 806 extends downward towards a distal end of the zipper handle. The zipper lock arm is generally orthogonal to the zipper handle 804. The zipper lock arm 806 includes an aperture 808 that extends entirely therethrough. Moreover, the zipper lock arm circumscribes the aperture 808. In this manner, the locking mechanism of the electronic lock (e.g., FIG. 7) cooperates with the aperture 808 to lock the zipper clasp 800 to the electronic lock 700 when the electronic lock 700 is in a locked state.

Referring to FIG. 9A and FIG. 9B, a locking system is illustrated, according to aspects of the present disclosure herein. The locking system can be implemented within the housing 702 (FIG. 7) for instance. FIG. 9A illustrates the locking system in a locked state, whereas FIG. 9B illustrates the locking system in an unlocked state.

The locking system receives a locking mechanism 900 (e.g., the zipper clasp 800, FIG. 8). Additionally the locking system includes a motive device 902, e.g., a motor, a lock lever 904, a spring-loaded unlocking mechanism 906, a lock defined by a locking pin 908, a locking spring 910, control circuitry 912, e.g., any of the circuits set out with regard to FIG. 1-FIG. 6, or any combination thereof, an energy source, e.g., battery 914, and release springs 918.

With reference to FIG. 9A and FIG. 9B generally, when a locking mechanism 900 (e.g., zipper clasp) is inserted into the locking system and the lock lever 904 is in a locked state (FIG. 9A), a user urges the locking mechanism downward into the housing such that the zipper lock arm (806, FIG. 8) compresses the release springs 918. As the release springs 918 compress, the aperture (aperture 808, FIG. 8) aligns with the locking pin 908. The end of the locking spring 910 urges the locking pin 908 through the aperture 808 of the zipper clasp 800 thus locking the zipper clasp 800 to the locking system. Here, the release springs 918 are maintained compressed and are held compressed by the engagement of the locking pin 908 and the aperture of the locking mechanism.

As best illustrated in FIG. 9B, to unlock the locking mechanism 900, the control circuitry 912, responsive to an unlock command, causes the motive device 902 to rotate its shaft, thus causing a cam to slide the lock lever 904 laterally across the locking system. Here, the motive device 902 and cam define the electric actuator described more fully herein. The lock lever 904 includes a wedge-shaped face that engages a block of the locking pin 908. As the cam moves the lock lever 904 laterally, the wedge of the lock lever 904 urges against the block of the locking pin 908, thus moving the locking pin 908 away from the spring-loaded locking mechanism 906 so as to compress the locking spring 910. When the lock lever 904 has retracted the locking pin 908 sufficient to remove the locking pin 908 from the aperture 808 of the zipper clasp, the spring-loaded unlocking mechanism, under spring force, ejects the zipper clasp from the housing via the release springs 918.

Referring to FIG. 10, select components of a locking system are illustrated in greater detail for clarity of discussion. The components illustrated in FIG. 10 can be utilized to implement components of the locking system of FIG. 9. As such, like components are illustrated with like reference numbers that are 100 higher than their counterparts illustrated in FIG. 9A and FIG. 9B.

In operation, when a user pushes a locking mechanism 1000 (e.g., clasp) into the housing of a lock, a projection of the clasp compresses a release 1016 via springs 1018. To keep the release 1016 in a biased position, the locking pin 1008 includes a nose that is received into an aperture of the projection of the locking mechanism 1000. The locking pin 1008 is urged into the aperture via spring 1010. Thus, the spring 1010 and springs 1018 compress and expand in orthogonal directions. To unlock the device the lock lever (see lock lever 904) moves laterally across the locking pin 1008 into the "C" opening, in a wedging motion. As the lock lever wedges into the locking pin 1008, the locking pin 1008 begins to recess, thus compressing the spring 1010 until the nose of the locking pin 1008 releases from the aperture of the locking mechanism 1000. Once the nose is released, the bias of the springs 1018 causes the release 1016 to project up, thus launching the locking mechanism 1000 out of the housing of the lock. Thus, the unlock spring biases an ejection or partial ejection of the locking member from the lock housing.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Referring back to the FIGURES generally, in another example embodiment, the controller is programmed to enable or allow third-party device pairing. For instance, using Bluetooth, a user can custom program a Pairing code in response to a request to pair. Because the Pairing code is unique and known to the user (or programmed by the user in some embodiments), the user can decide to share that code with another device. For instance, if a user does not have access to their smart device, e.g., smart phone, but needs to unlock the electronic lock, the user can "borrow" a smart device and pair with that device using the known pairing code. In some embodiments, the controller, recognizing a correct pairing code, but different MAC address, can log the occurrence, e.g., including a time stamp, location stamp, MAC address stamp, etc.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure.

Having thus described the disclosure of the present application in detail and by reference to embodiments thereof, it will be apparent that modifications and variations are possible without departing from the scope of the disclosure defined in the appended claims.

What is claimed is:

1. An electronic lock, comprising:

a housing having a lock aperture extending through a face thereof, the lock aperture configured to receive a lock arm of a corresponding locking mechanism, where the lock arm includes an aperture;

a controller contained in the housing;

a biometric interface attached to the housing;

a biometric reader contained in the housing, where the biometric reader is electrically coupled to the controller, and the biometric reader is electrically coupled to the biometric interface;

a locking system contained within the housing, the locking system having a release spring, a locking pin, a locking spring, an electric actuator, and a lock lever, wherein the locking system is controlled by the controller to transition between a locked position and an unlocked position such that:

to lock the locking mechanism to the housing:

the lock arm of the locking mechanism is inserted into the lock aperture of the housing until the lock arm compresses the release spring sufficient to enable the aperture of the lock arm to align with the locking pin of the locking system;

whereupon the locking spring of the locking system urges the locking pin into the aperture of the lock arm of the locking mechanism, thereby locking the locking mechanism to the housing; and to transition from the locked position to the unlocked position:

the controller controls the electric actuator to move the lock lever so as to compress the locking spring sufficient to release the locking pin from the aperture of the lock arm;

whereupon the release spring urges the lock arm toward the lock aperture of the housing away from the locking pin; and a battery that powers at least the controller, the biometric reader, and the electric actuator;

wherein:

the controller issues an electronic unlock command signal to the electric actuator to cause the electronic lock to transition from the locked position to the unlocked position upon agreement of a match of electronic data corresponding to a biometric read by the biometric reader to biometric data accessible by the controller identifying an authorized user.

2. The electronic lock of claim 1, wherein the aperture of the lock arm extends entirely through the lock arm.

3. The electronic lock of claim 1, wherein to transition from the locked position to the unlocked position, the controller controls the electric actuator to rotate a shaft of the electric actuator, thus causing a cam to slide the lock lever laterally across the locking system.

4. The electronic lock of claim 3, wherein the lock lever includes a wedge that engages a block of the locking pin such that as the cam moves the lock lever laterally, the wedge of the lock lever urges against the block of the locking pin, thus moving the locking pin away from the lock arm of the locking mechanism so as to compress the locking spring.

5. The electronic lock of claim 1 further comprising:

a keyhole that passes through the housing;

wherein:

the locking system further comprises a mechanical key receiver configured to accept a physical key passed through the keyhole; and the locking system is controlled to transition from the locked position to the unlocked position by the mechanical key receiver engaged by the physical key such that the physical key can unlock the electronic lock independent of the unlock command signal from the controller.

6. The electronic lock of claim 5, wherein the mechanical key receiver accept a physical key that is compatible with a Transportation Security Administration (TSA) key to transition the electronic lock from the locked position to the unlocked position.

7. The electronic lock of claim 1 further comprising:

a proximity-based wireless communication device electrically coupled to the controller;

wherein:

the controller further issues an unlock command signal to the electric actuator to cause the electronic lock to transition from the locked position to the unlocked position upon determining agreement of a verification comprising:

a match of an identifier read by the proximity-based wireless communication device to stored identity data accessible by the controller identifying an authorized user.

8. The electronic lock of claim 7, wherein the proximity-based wireless communication device comprises at least one of a nearfield electronic communication (NFC) reader that communicates with a corresponding NFC tag, and a Bluetooth receiver that is configured to pair with the authorized user.

9. The electronic lock of claim 1 further comprising:
a proximity-based wireless communication device electrically coupled to the controller;
wherein:
the controller issues an unlock command signal to the electric actuator to cause the lock to transition from the locked position to the unlocked position upon determining agreement of a multi-part electronic verification comprising:
a match of an identifier read by the proximity-based wireless communication device to the same authorized user matched by the biometric reader.

10. The electronic lock of claim 1, wherein:
the locking mechanism comprises a select one of:
a zipper clasp, wherein the lock comprises a locking member that restricts the clasp, when inserted into the lock aperture, from being removed when the lock is in the locked position; or
the lock comprises a locking member that restricts at least one of a shackle, hook, or bolt inserted into the lock aperture from being removed when the lock is in the locked position.

11. The electronic lock of claim 1 further comprising:
a global positioning system (GPS) receiver that is controlled by the controller to determine the position of the electronic lock when an attempt is made to unlock the lock, wherein:
the controller reads a list of geoboundaries to determine whether multi-part electronic verification is required.

12. The electronic lock of claim 11, wherein:
the controller is programmed with at least one approved geoboundary;
the controller issues an unlock command signal to the electric actuator to cause the lock to transition from the locked position to the unlocked position from any one of the fingerprint scanner or the proximity-based wireless communication device when the controller determines from the GPS receiver that the electronic lock is in a predetermined approved geoboundary; and
the controller requires a multi-part electronic verification to issue an unlock command signal to the electric actuator to cause the lock to transition from the locked position to the unlocked position when the electronic lock is not within the predetermined approved geoboundary.

13. The electronic lock of claim 1, wherein:
agreement of a match of electronic data corresponding to a biometric read by the biometric reader to data identifying an authorized user is determined from:
data collected detecting a series of taps on the biometric reader, thus forming a PIN, where the determined PIN is compared to the data identifying the authorized user.

14. The electronic lock of claim 1, wherein:
the controller issues the electronic unlock command signal to the electric actuator to cause the lock to transition from the locked position to the unlocked position further upon:
receipt by the controller, of a voice command that instructs the controller to issue the unlock command signal, where the voice is determined to be from the authorized user.

15. The electronic lock of claim 1, wherein:
the controller issues the electronic unlock command signal to the electric actuator to cause the lock to transition from the locked position to the unlocked position further upon:
receipt of a command from an app on a smartphone, the smartphone communicably coupled to the lock, wherein the command instructs the controller to issue the unlock command signal.

16. An article including an electronic lock, comprising:
a zipper clasp, the zipper clasp having:
a zipper handle;
a zipper attachment extending from the zipper handle, the zipper attachment having a securement for attaching the zipper clasp to a zipper of the article; and
a zipper lock arm extending generally orthogonally from the zipper handle proximate to an end portion of the zipper handle that is opposite the zipper attachment, the zipper lock arm having an aperture; and
an electronic lock secured to the article, the electronic lock having:
a housing having a front face defining a major surface, at least a portion of the front face exposed to a user, and a lock aperture extending through the front face, the lock aperture dimensioned to receive the zipper lock arm of the zipper clasp;
a controller contained in the housing;
a biometric interface attached to the housing;
a biometric reader contained in the housing, the biometric reader electrically coupled to the controller, the biometric reader also electrically coupled to the biometric interface;
a locking system contained within the housing, the locking system having a release spring, a locking pin, a locking spring, an electric actuator, and a lock lever, wherein the locking system is controlled by the controller to transition between a locked position and an unlocked position such that:
to lock the zipper clasp to the housing:
the zipper lock arm of the zipper clasp is inserted into the lock aperture of the housing until the zipper lock arm compresses the release spring sufficient to enable the aperture of the zipper lock arm to align with the locking pin of the locking system;
whereupon the locking spring of the locking system urges the locking pin into the aperture of the zipper lock arm of the zipper clasp, thereby locking the zipper clasp to the housing; and
to transition from the locked position to the unlocked position:
the controller controls the electric actuator to move the lock lever so as to compress the locking spring sufficient to release the locking pin from the aperture of the zipper lock arm;
whereupon the release spring urges the lock arm toward the lock aperture of the housing away from the locking pin; and
a battery that powers at least the controller, the biometric reader, and the electric actuator;
wherein:

the controller issues an electronic unlock command signal to the electric actuator to cause the lock to transition from the locked position to the unlocked position upon:

agreement of a match of electronic data corresponding to a biometric read by the biometric reader to biometric data accessible by the controller identifying an authorized user.

17. The article of claim 16, wherein the aperture of the zipper lock arm extends entirely through the zipper lock arm.

18. The article of claim 16, wherein to transition from the locked position to the unlocked position, the controller controls the electric actuator to rotate a shaft of the electric actuator, thus causing a cam to slide the lock lever laterally across the locking system.

19. The article of claim 18, wherein the lock lever includes a wedge that engages a block of the locking pin such that as the cam moves the lock lever laterally, the wedge of the lock lever urges against the block of the locking pin, thus moving the locking pin away from the zipper lock arm of the zipper clasp so as to compress the locking spring.

20. The article of claim 16, wherein the article comprises a select one of a diary, a bag, a luggage article, a purse, a backpack, a carry case, or a pouch.

* * * * *